US012763645B2

(12) United States Patent
Kuo et al.

(10) Patent No.: US 12,763,645 B2
(45) Date of Patent: Oct. 13, 2026

(54) OPTICAL ELEMENT DRIVING MECHANISM

(71) Applicant: Actutek Corporation, Taoyuan City (TW)

(72) Inventors: Chen-Chi Kuo, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 0 days.

(21) Appl. No.: 18/397,721

(22) Filed: Dec. 27, 2023

(65) Prior Publication Data

US 2024/0128836 A1 Apr. 18, 2024

Related U.S. Application Data

(63) Continuation of application No. 17/514,413, filed on Oct. 29, 2021, now Pat. No. 11,894,728, which is a
(Continued)

(30) Foreign Application Priority Data

Nov. 28, 2018 (CN) ......................... 201811434172.4

(51) Int. Cl.
*G02B 7/02* (2021.01)
*G02B 7/04* (2021.01)
(Continued)

(52) U.S. Cl.
CPC ............. *H02K 11/02* (2013.01); *G02B 7/023* (2013.01); *G02B 7/04* (2013.01); *G02B 7/08* (2013.01);
(Continued)

(58) Field of Classification Search
CPC . G02B 7/023; G02B 7/04; G02B 7/08; G02B 7/09; G02B 27/646; G03B 3/10;
(Continued)

(56) References Cited

U.S. PATENT DOCUMENTS 7,889,445 B2 * 2/2011 Yang ......................... G02B 7/08 359/822
2012/0020654 A1 1/2012 Yanagisawa et al.
(Continued)

FOREIGN PATENT DOCUMENTS

CN 105988262 A 10/2016
CN 209373236 U 9/2019
TW M516172 U * 1/2016 ............... G03B 5/02

OTHER PUBLICATIONS

Chinese Office Action with Search Report in application No. 201811434172.4 dated Jun. 24, 2021, pp. 1-6.

*Primary Examiner* — Mahidere S Sahle
(74) *Attorney, Agent, or Firm* — MUNCY, GEISSLER, OLDS & LOWE, P.C.

(57) ABSTRACT

An optical element driving mechanism is provided. The optical element driving mechanism includes a frame, a holder, and a driving assembly. The holder is connected to an optical element with an optical axis. The holder is movable relative to the frame. The driving assembly drives the holder to move relative to the frame. The drive assembly includes a first coil, a first magnetic element, and a second magnetic element. The first magnetic element corresponds to the first coil. The second magnetic element is not in direct contact with the first magnetic element. The first magnetic element has a first surface facing the first coil and a second surface facing the second magnetic element. The first surface is not parallel with the second surface.

21 Claims, 20 Drawing Sheets

1

Related U.S. Application Data continuation of application No. 16/211,869, filed on Dec. 6, 2018, now Pat. No. 11,190,085.

(60) Provisional application No. 62/595,805, filed on Dec. 7, 2017.

(51) Int. Cl.

| | |
|---|---|
| ***G02B 7/08*** | (2021.01) |
| ***G02B 7/09*** | (2021.01) |
| ***G02B 27/64*** | (2006.01) |
| ***G03B 3/10*** | (2021.01) |
| ***G03B 5/02*** | (2021.01) |
| ***G03B 13/36*** | (2021.01) |
| ***G03B 19/22*** | (2021.01) |
| ***H02K 11/02*** | (2016.01) |
| ***H02K 41/035*** | (2006.01) |
| *H02K 11/215* | (2016.01) |

(52) U.S. Cl.

CPC ............. *G02B 7/09* (2013.01); *G02B 27/646* (2013.01); *G03B 3/10* (2013.01); *G03B 5/02* (2013.01); *G03B 13/36* (2013.01); *G03B 19/22* (2013.01); *H02K 41/0356* (2013.01); *G03B 2205/0007* (2013.01); *G03B 2205/0038* (2013.01); *G03B 2205/0069* (2013.01); *H02K 11/215* (2016.01)

(58) Field of Classification Search

CPC .......... G03B 5/02; G03B 13/36; G03B 19/22; G03B 2205/0007; G03B 2205/0038; G03B 2205/0069; H02K 11/02; H02K 11/215; H02K 41/0356

USPC .................................. 359/694–706, 822–826

See application file for complete search history.

(56) References Cited

U.S. PATENT DOCUMENTS

| | | | | |
|---|---|---|---|---|
| 2012/0039589 | A1* | 2/2012 | Ku | G03B 5/00 396/55 |
| 2013/0343738 | A1* | 12/2013 | Ryu | H04N 23/687 396/55 |
| 2016/0209618 | A1* | 7/2016 | Avivi | G11B 7/093 |
| 2016/0277684 | A1 | 9/2016 | Park et al. | |
| 2019/0041601 | A1* | 2/2019 | Hou | G02B 13/009 |
| 2019/0072744 | A1* | 3/2019 | Hu | G02B 7/08 |
| 2019/0121055 | A1* | 4/2019 | Lee | H04N 23/54 |
| 2020/0083793 | A1* | 3/2020 | Han | G02B 27/646 |

* cited by examiner

OPTICAL ELEMENT DRIVING MECHANISM

CROSS REFERENCE TO RELATED APPLICATIONS

This application is a Continuation of U.S. patent application Ser. No. 17/514,413, filed on Oct. 29, 2021, which is a Continuation of U.S. patent application Ser. No. 16/211,869, filed on Dec. 6, 2018, which claims priority of U.S. Provisional Patent Application Ser. No. 62/595,805, filed on Dec. 7, 2017, and China Patent Application No. 201811434172.4 filed on Nov. 28, 2018, the entirety of which is incorporated by reference herein.

BACKGROUND OF THE INVENTION

Field of the Invention

The application relates in general to a driving mechanism, and in particular, to a driving mechanism for moving an optical element.

Description of the Related Art

As technology has advanced, a lot of electronic devices (such as cameras and smartphones) have incorporated the functionality of taking photographs and recording video. These electronic devices have become more commonplace, and have been developed to be more convenient and thin. More and more options are provided for users to choose from.

In some existing cell phones, a dual-lens camera system having two lens driving mechanisms may be applied. As the lens driving mechanisms in the dual-lens camera system are usually arranged close to each other, magnetic interference between the magnets of the two lens driving mechanisms is likely to occur, causing the focus speed and accuracy of the lenses to be adversely affected. Therefore, what is needed is a multi-lens camera system that can prevent magnetic interference between the two lens driving mechanisms.

BRIEF SUMMARY OF INVENTION

In view of the aforementioned problems, the object of the invention is to provide a driving mechanism that includes a fixed module, a movable module, and a drive assembly. The movable module is movably connected to the fixed module and holds the optical element. The drive assembly is disposed on the fixed module and the movable module, having a magnet and a coil for moving the movable module relative to the fixed module along a first axis, wherein the central axis of the magnet is offset from the center of the coil and extends through a part of the coil, and the central axis is perpendicular to the first axis.

In some embodiments, the fixed module has a housing, and the coil has an inner portion and an outer portion closer to the housing than the inner portion, wherein the central axis of the magnet extends through the inner portion.

In some embodiments, the magnet is disposed on the movable module, and the coil is disposed on the fixed module.

In some embodiments, the movable module has a holder and a frame, the holder holds the optical element and movably connects to the frame, and the magnet is affixed to the frame.

In some embodiments, the drive assembly further has a magnetically conductive element disposed on the side of the magnet.

In some embodiments, the magnet is closer to the coil than the magnetically conductive element.

In some embodiments, the drive assembly further has two magnets of the same polarity, and the two magnets are arranged along a second axis perpendicular to the first axis.

In some embodiments, the drive assembly further has a magnetically conductive element disposed between the two magnets.

In some embodiments, the magnetically conductive element protrudes from the two magnets.

In some embodiments, the magnetically conductive element and the two magnets form a recess therebetween.

In some embodiments, the drive assembly further has a plurality of magnetically conductive elements disposed between the two magnets.

In some embodiments, the drive assembly further has a plurality of magnetically conductive elements, and the magnetically conductive elements and the magnets are arranged in a staggered manner along the second axis.

In some embodiments, the movable module has a holder and a frame, the holder holds the optical element and movably connects to the frame, and the frame movably connects to the fixed module, wherein the frame forms a first cavity, a second cavity, and a rib, the two magnets are respectively affixed in the first and second cavities, and the rib is disposed between the magnets.

In some embodiments, the movable module has a holder and a frame, the holder holds the optical element and movably connects to the frame, and the frame movably connects to the fixed module, wherein the frame forms a first cavity and a second cavity that is wider than the first cavity, and the two magnets are respectively affixed in the first and second cavities.

In some embodiments, the drive assembly further has a magnetically conductive element disposed between the two magnets and received in the second cavity.

In some embodiments, the magnetically conductive element is longer than the two magnets.

In some embodiments, the drive assembly further has two coils respectively disposed on the movable module and the fixed module, and the two coils are respectively located on two adjacent sides of the magnet.

In some embodiments, the drive assembly further has two magnets and two coils corresponding to the two magnets, and the two coils are respectively disposed on the movable module and the fixed module, wherein the two magnets have the same polarity and are arranged along a second axis perpendicular to the first axis.

Another object of the invention is to provide a multiple-lens camera system including two driving mechanisms as mentioned above. Each of the driving mechanisms has a quadrilateral structure, and the magnets respectively in the two the driving mechanisms are located on two adjacent sides of the driving mechanisms.

Another object of the invention is to provide a multiple-lens camera system including the driving mechanism as mentioned above and a camera unit. The camera unit includes an optical lens, a plurality of magnetic elements, and a coil, wherein the magnetic elements are disposed at the corners of the camera unit, and when a current is applied to the coil, an electromagnetic force is generated by the magnetic elements and the coil to move the optical lens. Specifically, the driving mechanism and the camera unit are arranged along the first axis, and the magnet and the magnetic elements do not overlap in a direction parallel to the first axis.

In some embodiments, the magnet has a length in a longitudinal direction, and the magnetic elements are spaced apart from each other by a distance in the longitudinal direction, wherein the length is shorter than the distance.

Another object of the invention is to provide a multiple-lens camera system including four driving mechanisms as mentioned above, wherein the driving mechanisms have a quadrilateral structure and are arranged in a matrix, the drive assembly in each of the driving mechanisms further has two magnets and two coils corresponding to the magnets, and the magnets are respectively offset from the center of the coils.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the multi-lens camera system and driving mechanism thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
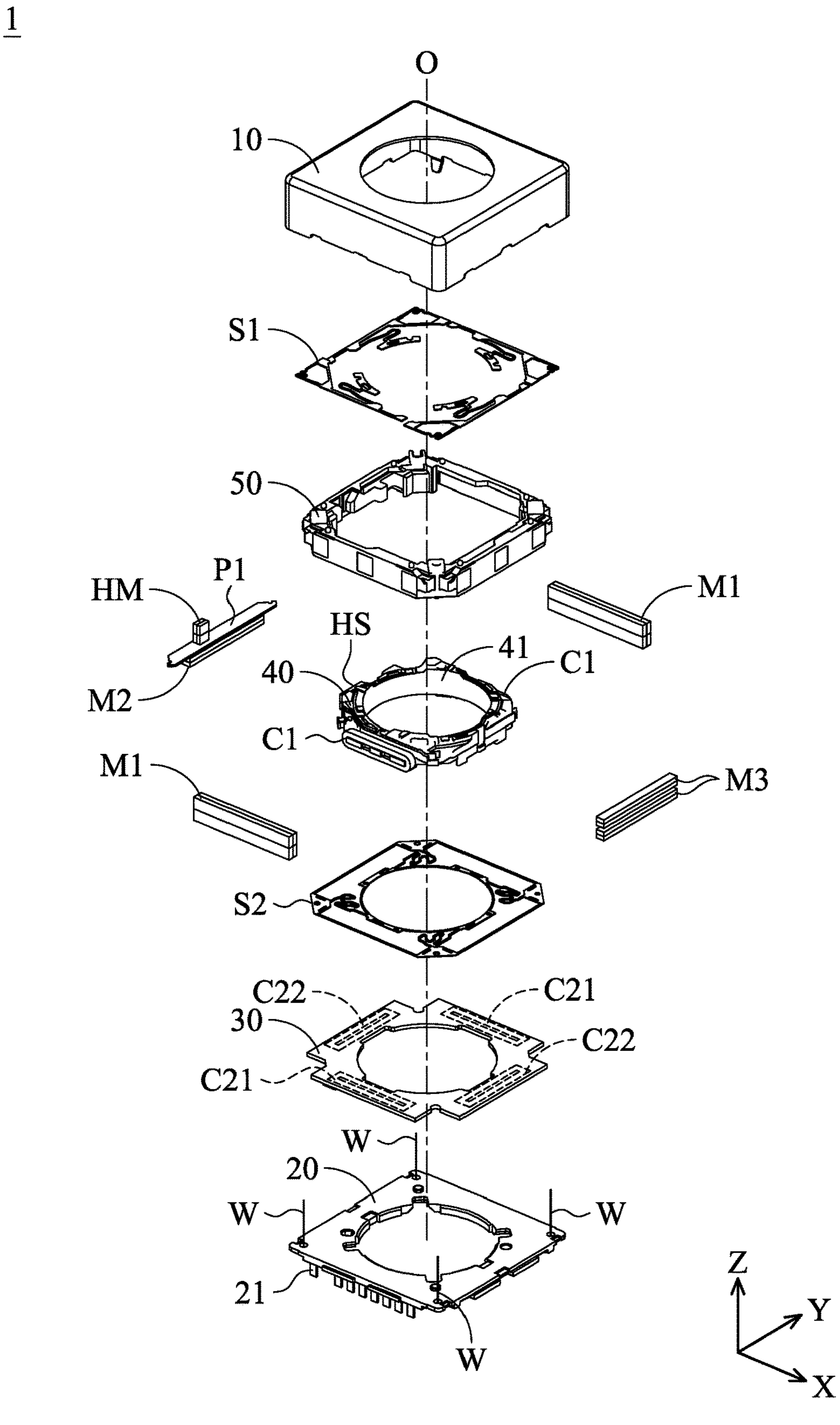
FIG. 1 shows an exploded view of a driving mechanism 1 in accordance with an embodiment of the invention.
Figure 2:
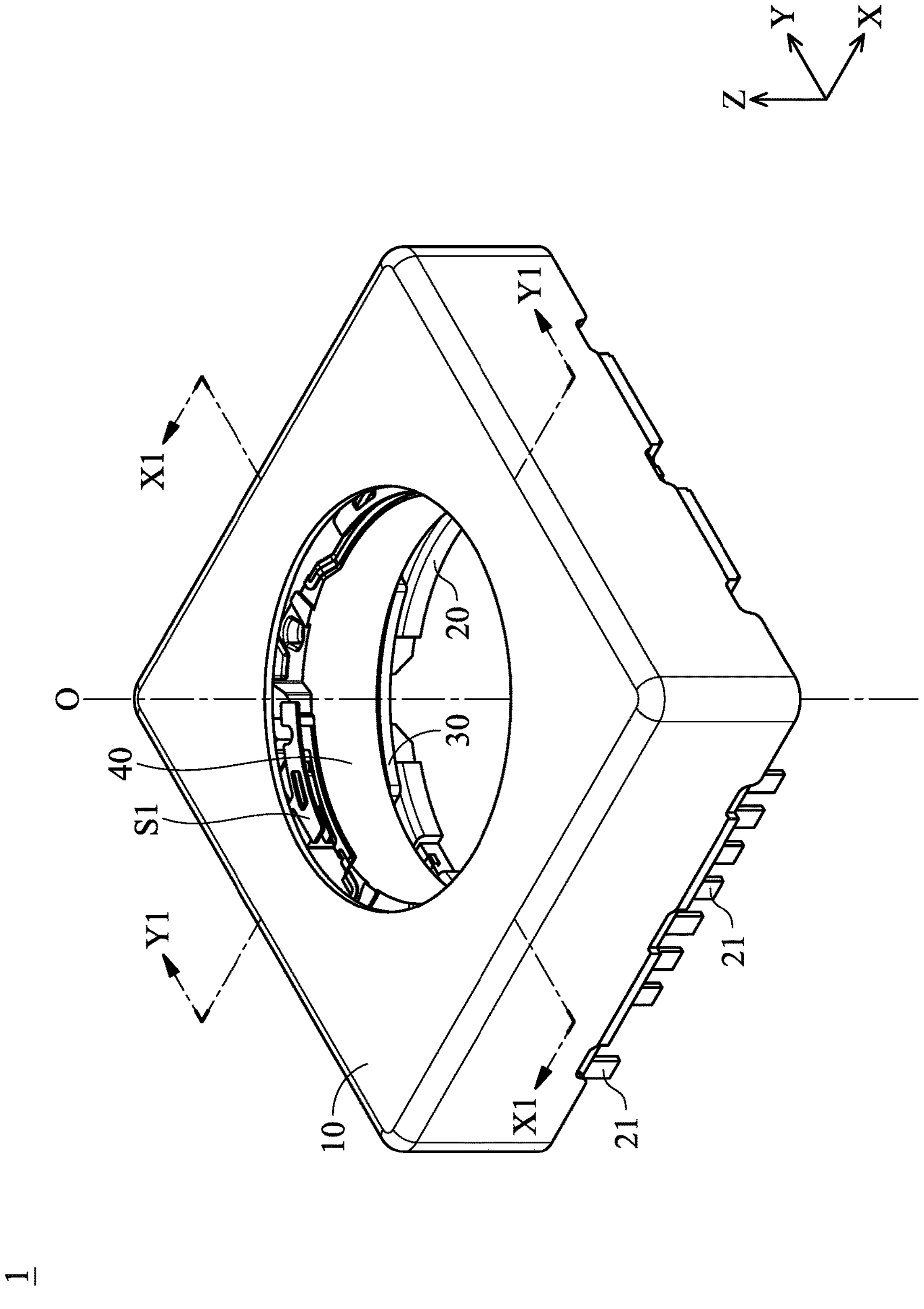
FIG. 2 shows a perspective diagram of the driving mechanism 1 in FIG. 1 after assembly.
Figure 3:
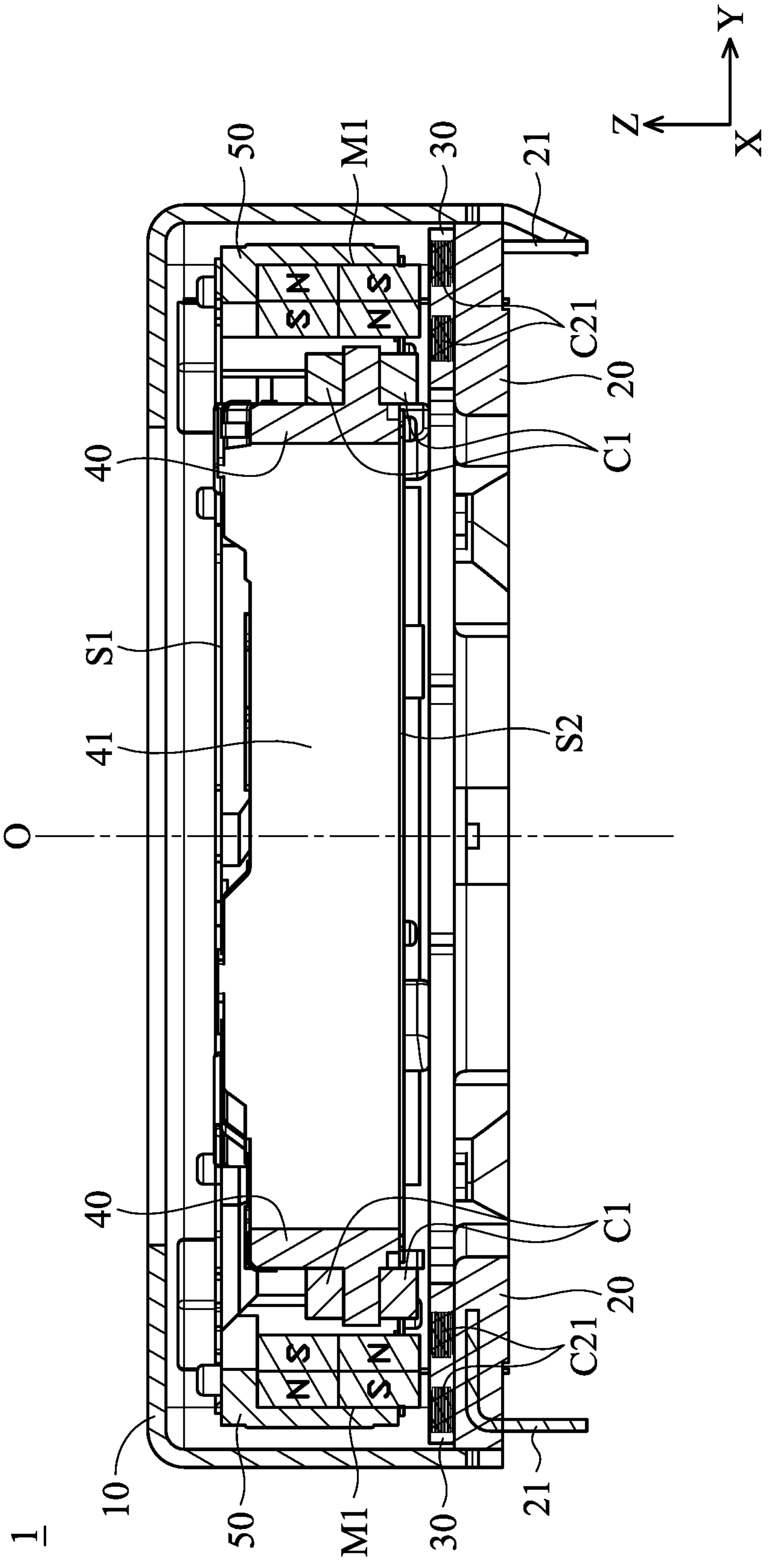
FIG. 3 shows a cross-sectional view taken along line X1-X1 in FIG. 2.
Figure 4:
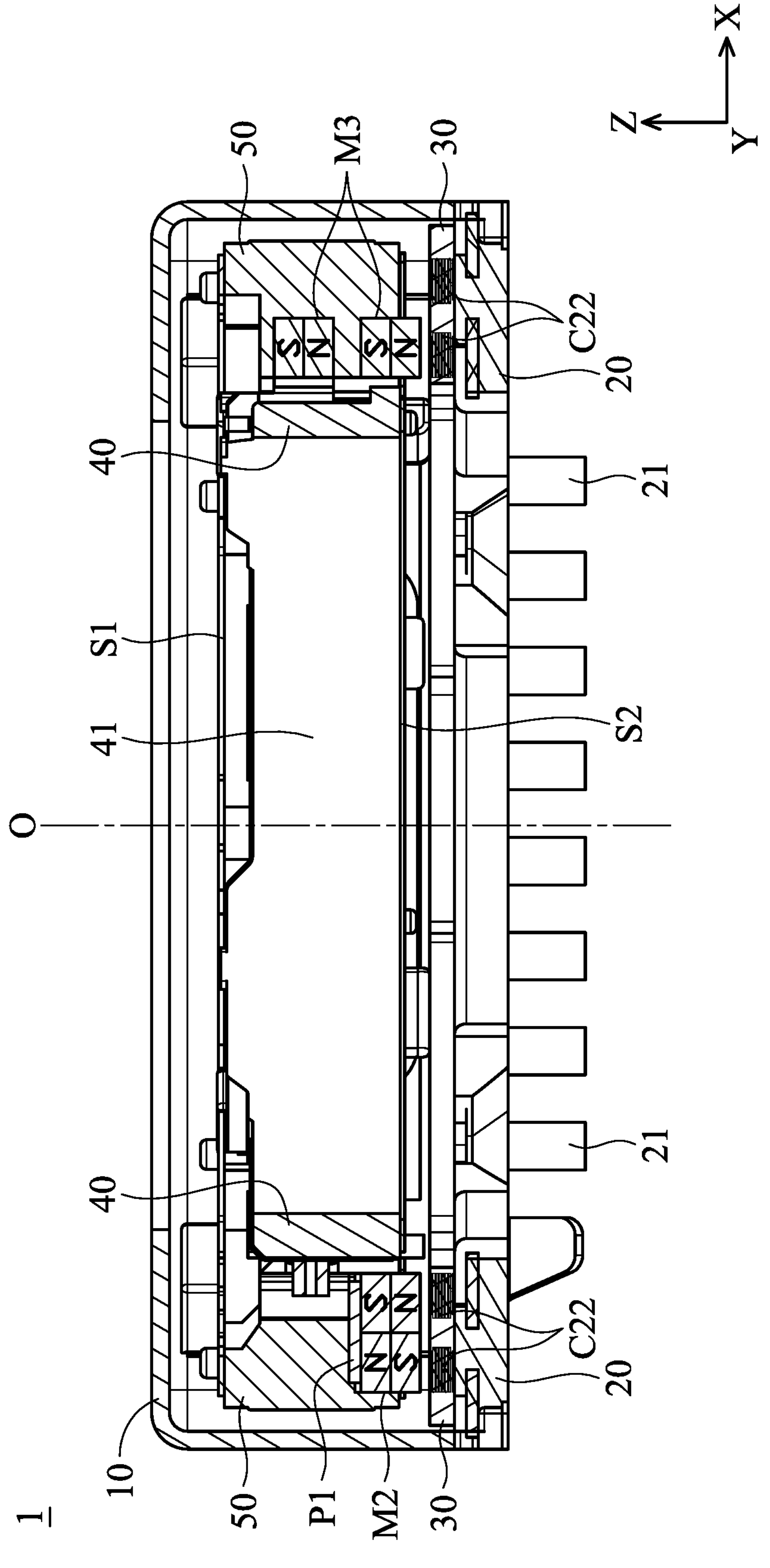
FIG. 4 shows another cross-sectional view taken along line Y1-Y1 in FIG. 2.

Referring to FIGS. 1-4, FIG. 1 shows an exploded view of a driving mechanism 1 in accordance with an embodiment of the invention, FIG. 2 shows a perspective diagram of the driving mechanism 1 in FIG. 1 after assembly, FIG. 3 shows a cross-sectional view taken along line X1-X1 in FIG. 2, and FIG. 4 shows another cross-sectional view taken along line Y1-Y1 in FIG. 2. The driving mechanism 1 in this embodiment may be a Voice Coil Motor (VCM) which may be disposed in a cell phone or other portable electronic device for driving an optical element (e.g. optical lens) to move, thereby achieving the function of auto-focusing (AF) or Optical Image Stabilization (OIS).

As shown in FIG. 1, the driving mechanism 1 primarily comprises a housing 10, a base 20, a circuit board 30, a holder 40, a frame 50, an upper spring S1, and a lower spring S2. In this embodiment, the housing 10 has a hollow structure affixed to the base 20, and the circuit board 30 is also affixed to the base 20, so that the housing 10, the base 20, and the circuit board 30 form a fixed module. Additionally, the holder 40 and the frame 50 are movably received in the housing 10, and an optical element (not shown) is disposed in an opening 41 of the holder 40. The frame 50, the holder 40, and the optical element in the holder 40 form a movable module which can be moved relative to the fixed module.

The holder 40 is connected to the frame 50 via the upper and lower springs S1 and S2, so that the holder 40 can be suspended within the frame 50. Moreover, the base 20 is connected to the frame 50 and the upper spring S1 via four resilient elements W, so that the frame 50 is movable within the housing 10. In some embodiments, the upper and lower springs S1 and S2 may comprise metal, and the resilient elements W may have a long and thin metal structure.

With the configuration as described above, external light can enter the driving mechanism 1 substantially along an optical axis O of the optical element, and light can propagate through the optical element to an image sensor (not shown) below the base 20 to form a digital image.

It should be noted that the frame 50, the holder 40 and the optical element received therein can move relative to the base 20 and the circuit board 30 along a first axis parallel to the XY plane, thereby achieving the function of OIS. Additionally, the holder 40 and the optical element received therein can move relative to the frame 50 along a second axis (Z axis) parallel to the optical axis O, thereby achieving the function of auto-focusing (AF).

As shown in FIGS. 1, 3, and 4, two oval-shaped coils C1 are disposed on opposite sides of the holder 40, and four coils C21 and C22 are respectively embedded on four sides of the circuit board 30. Moreover, several magnets M1, M2, and M3 are disposed on the four inner surfaces of frame 50. In this embodiment, the magnets M1 may be multipolar magnets, wherein the magnets M1 are located corresponding to the coils C1 on the holder 40 and the coils C21 embedded in the circuit board 30. The magnets M2 and M3 are located corresponding to the coils C22 embedded in the circuit board 30. For example, the coils C21 and C22 may comprise planar coils or FP-coils which are electrically connected to the conductive pins 21 under the base 20.

The upper spring S1 can be electrically connected to the coils C1 via conductive traces (not shown) on the holder 40, and the both ends of the four resilient elements W respectively connect to the upper spring S1 and the conductive traces (not shown) on the base 20. Therefore, an external circuit can provide an electrical current to the coils C1 on the holder 40 via the conductive pins 21 under the base 20. It should be noted that when a current signal is applied to the coils C1, an electromagnetic force can be generated by the coils C1 and the magnets M1, so that the holder 40 and the optical element received therein can be driven to move relative to the frame 50 along the Z axis (second axis) for auto-focusing (AF).

Similarly, the external circuit can also provide an electrical current to the coils C21 or C22 in the circuit board 30 via the conductive pins 21 under the base 20. When a current signal is applied to the coils C21 or C22, an electromagnetic force can be generated by the coils C21/C22 and the magnets M2/M3, so that the frame 50, the holder 40 and the optical element received therein can be driven to move relative to the base 20 and the circuit board 30 along a horizontal direction (first axis) for Optical Image Stabilization (OIS).

FIG. 1 further shows a magnetically conductive element P1 and a magnet HM disposed above the magnet M2 and affixed to the frame 50, and a magnetic field sensor HS is disposed on a side of the holder 40 which is electrically connected to the upper spring S1 for sensing the magnet HM. It should be noted that the magnetically conductive element P1 can change and improve the magnetic field distribution near the magnet M2, so as to reduce magnetic interference between the magnet M2 and other magnetic elements. For example, the magnetic field sensor HS may be a Hall effect sensor, MR sensor, or Fluxgate sensor to detect the position variation of the magnet HM, so that the relative movement between the holder 40 and the frame 50 along the Z axis can be determined promptly.

Figure 5:
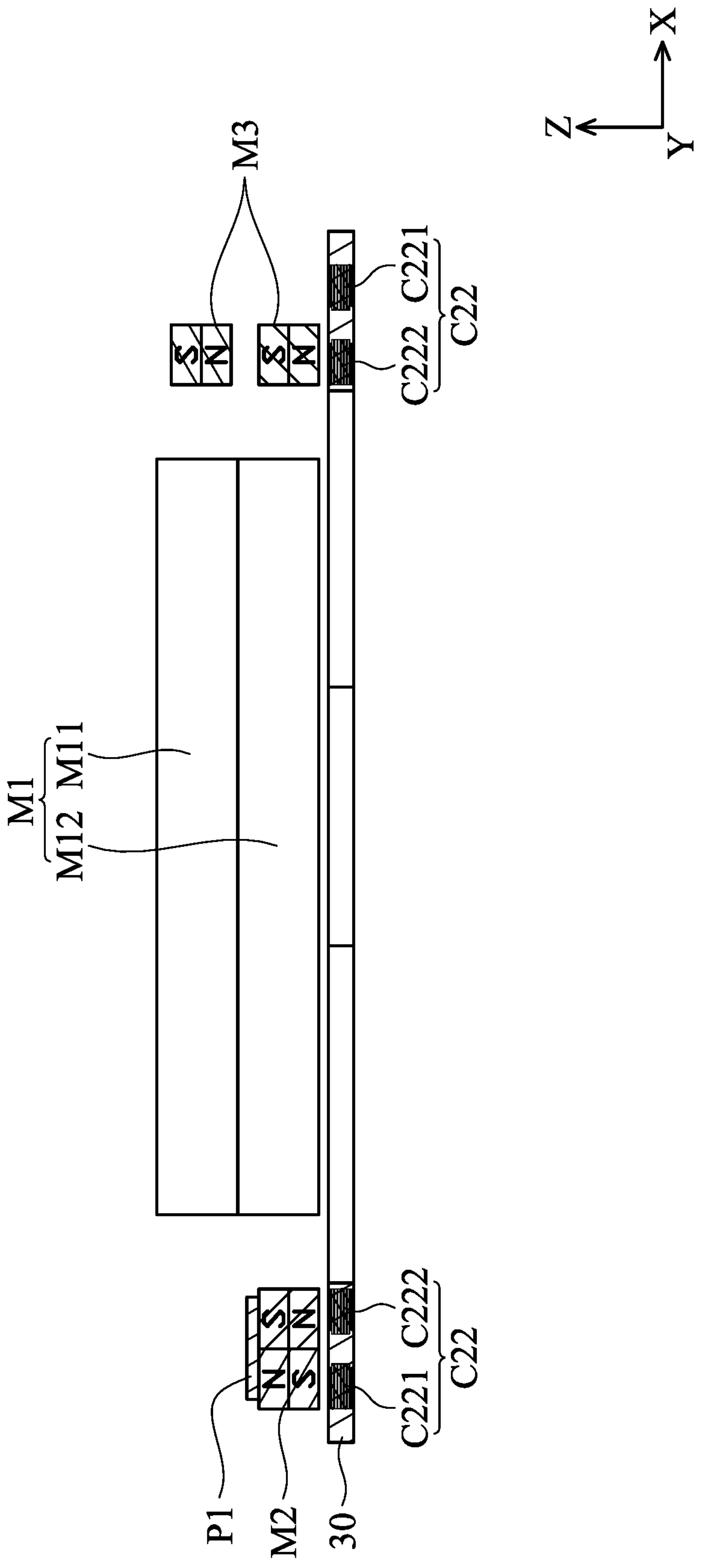
FIG. 5 is a schematic view showing relative position of the magnets M1, M2, M3, and the coils C22 in the circuit board 30 after assembly.

FIG. 5 is a schematic view showing relative position of the magnets M1, M2, M3, and the coils C22 in the circuit board 30 after assembly. Referring to FIGS. 4 and 5, two magnets M3 are arranged on a side of the holder 40 in the driving mechanism 1. The two magnets M3 are arrange along the Z axis, wherein their heights correspond to the heights of the upper and lower pars M11 and M12 of the magnet M1, and their direction of magnetization (N—S) is substantially parallel to the Z axis (second axis). It should be noted that the magnet M2 shown at the left of FIG. 5 is located corresponding to both the outer and inner portions C221 and C222 of the coil C22. In contrast, the magnet M3 shown at the right of FIG. 5 is located closer to the inner portion C222 of the coil C22 than the outer portion C221. Here, the outer portion C221 is closer to the housing 10 than the inner portion C222.

Figure 6:
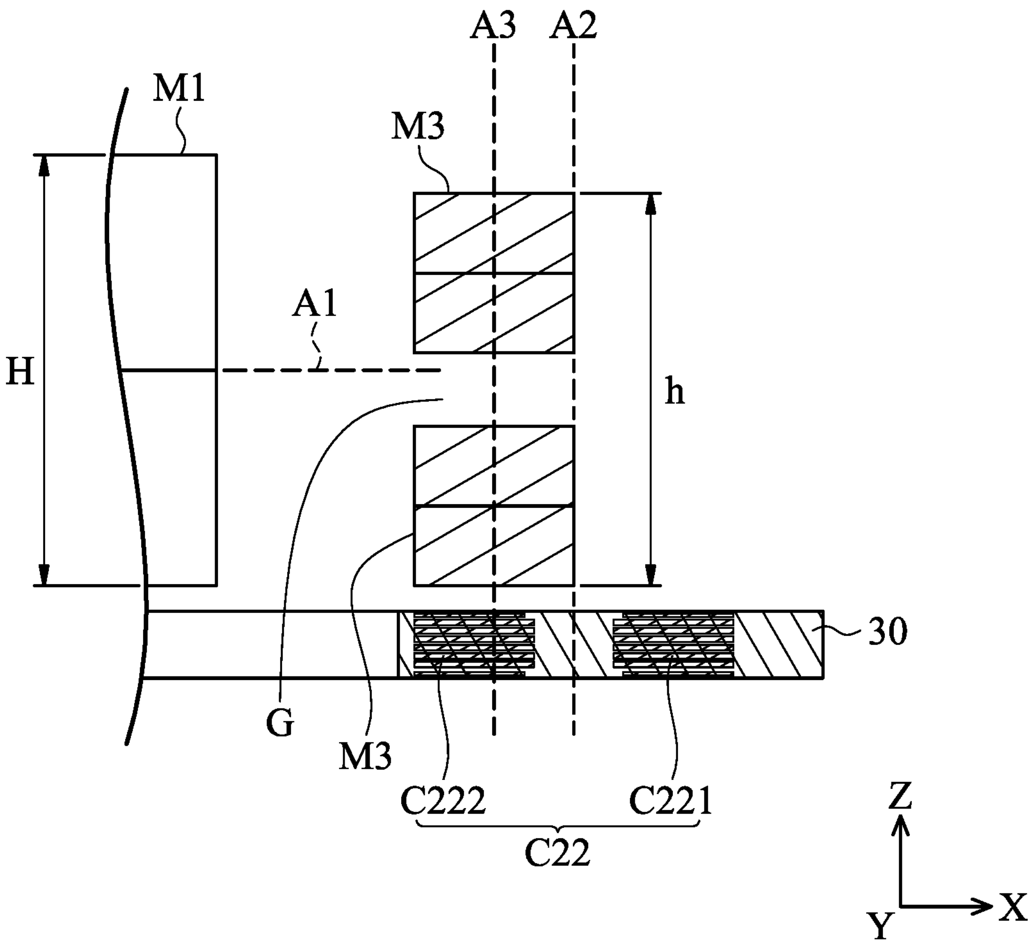
FIG. 6 is an enlarged view of the magnets M1, M3, and the coils C22 in the circuit board 30 of FIG. 5.

FIG. 6 is an enlarged view of the magnets M1, M3, and the coils C22 in the circuit board 30 of FIG. 5. As shown in FIG. 6, the height H of the magnet M1 is greater than the total height h of the two magnets M3 (H>h), wherein the ratio of h/H is ranged from 0.5 to 1.5, and a horizontal central line A1 of the magnet M1 extends through a gap G between the two magnets M3. It should be realized that because the magnets M3 are offset from the center A2 of the coil C22 toward the interior of the driving mechanism 1, the electronic or magnetic elements outside of the driving mechanism 1 can be protected against magnetic interference caused by the magnets M3. In this embodiment, the central line A3 of the lower magnet M3 extends through the inner portion C222 of the coil C22.

Figure 7:
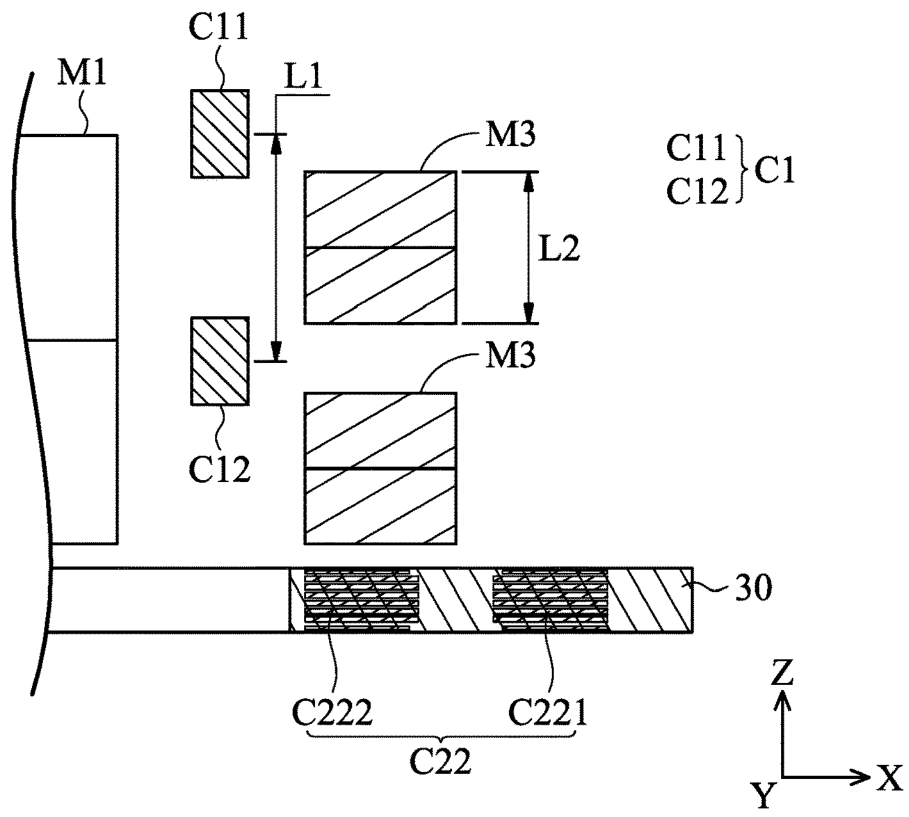
FIG. 7 is an enlarged view of the magnets M1, M3, the coil C1, and the coil C22 in the circuit board 30, in accordance with another embodiment of the invention.

FIG. 7 is an enlarged view of the magnets M1, M3, the coil C1, and the coil C22 in the circuit board 30, in accordance with another embodiment of the invention. This embodiment is different from FIG. 6 in that the driving mechanism 1 of FIG. 7 further comprises an additional oval coil C1, wherein the oval coil C1 is affixed to the holder 40 and located corresponding to the upper one of the two magnets M3.

As shown in FIG. 7, the oval coil C1 has an upper portion C11 and a lower portion C12, wherein the centers of the upper and lower portions C11 and C12 have a distance L1 that is greater than the thickness L2 of the magnet M3 along the Z axis. When a current signal is applied to the coil C1, an electromagnetic force can be generated between the coil C1 and the magnet M3, so that the holder 40 and the optical element therein can be driven to move relative to the frame 50 along the Z axis (second axis), and the function of auto-focusing (AF) can be performed.

Figure 8:
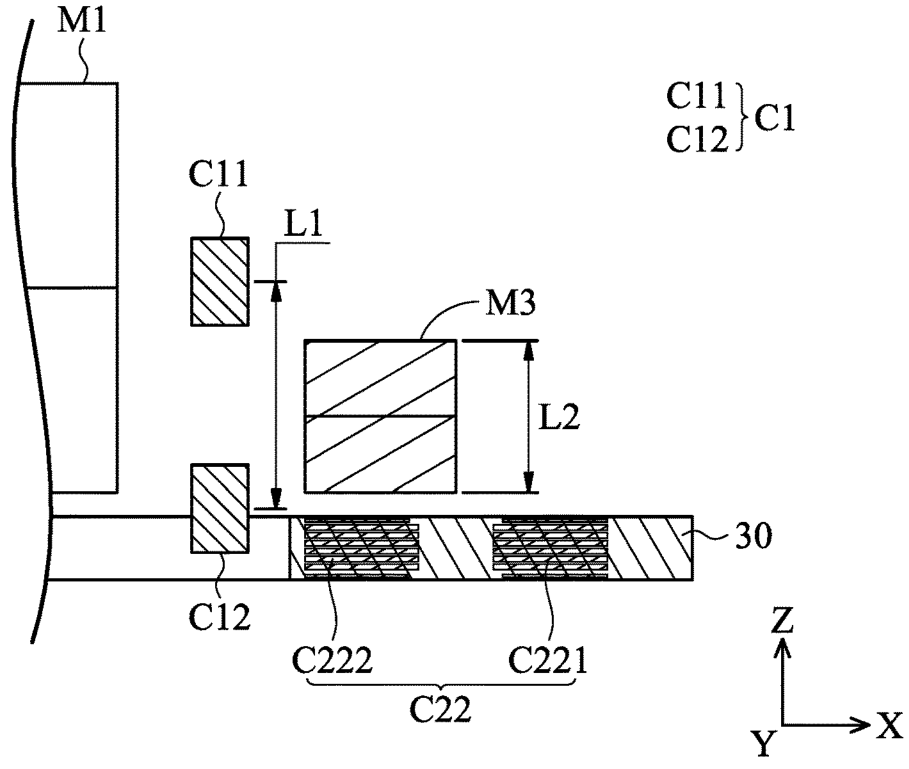
FIG. 8 is an enlarged view of the magnets M1, M3, the coil C1, and the coil C22 in the circuit board 30, in accordance with another embodiment of the invention.

FIG. 8 is an enlarged view of the magnets M1, M3, the coil C1, and the coil C22 in the circuit board 30, in accordance with another embodiment of the invention. This embodiment is different from FIG. 7 in that the driving mechanism 1 of FIG. 8 has only one magnet M3, and the coils C1 and C22 are disposed on two adjacent sides of the magnet M3.

As shown in FIG. 8, the centers of the upper and lower portions C11 and C12 of the coil C1 have a distance L1 that is greater than the thickness L2 of the magnet M3 along the Z axis. When a current signal is applied to the coil C1 in FIG. 8, an electromagnetic force can be generated between the coil C1 and the magnet M3, so that the holder 40 and the optical element therein to move relative to the frame 50 along the Z axis (second axis), and the function of auto-focusing (AF) can be performed. Similarly, when a current signal is applied to the coil C22 in the circuit board 30, an electromagnetic force can be generated by the coil C2 and the magnet M3, so that the frame 50, the holder 40, and the optical element in the holder 40 can be driven to move relative to the base 20 and the circuit board 30 along an horizontal direction parallel to the XY plane, so that the function of Optical Image Stabilization (OIS) can also be performed.

Figure 9:
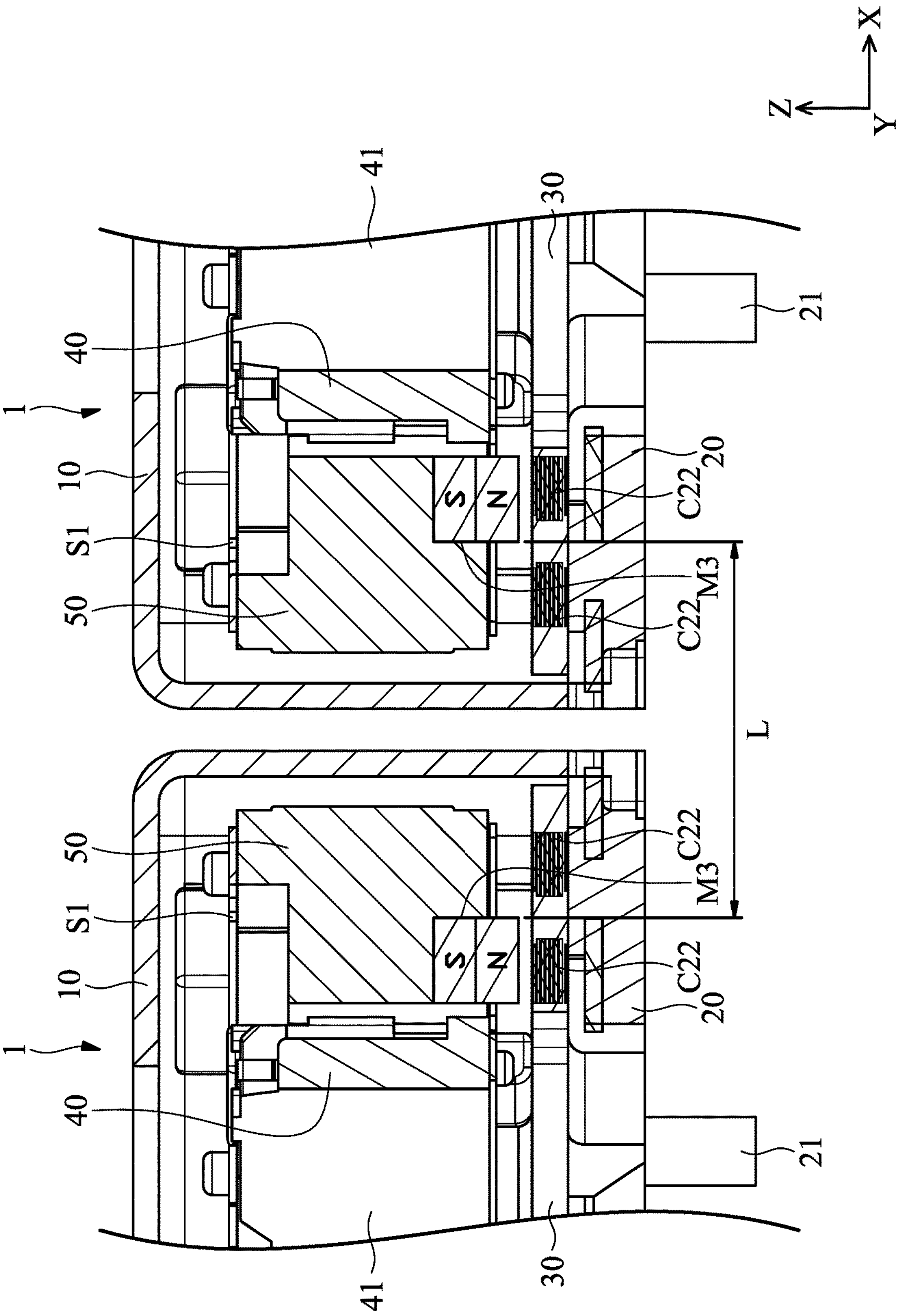
FIG. 9 a partial enlarged view of two driving mechanisms 1 arranged along the X axis.
Figure 10:
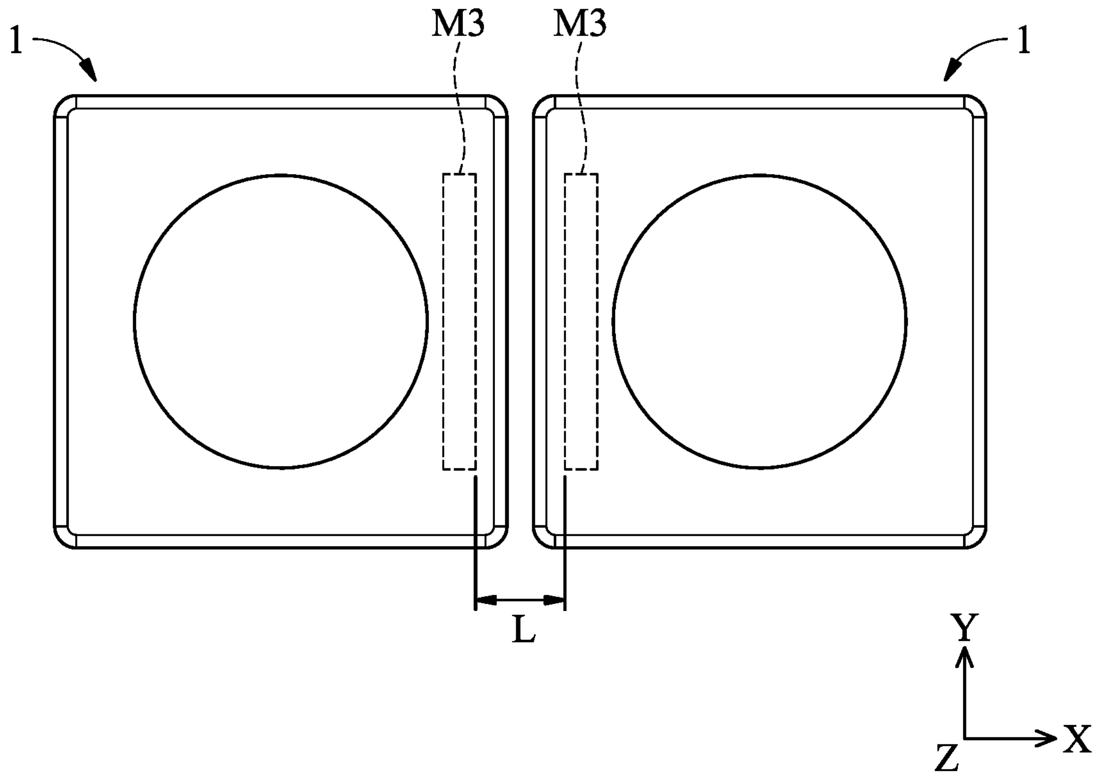
FIG. 10 is a top view of the two driving mechanisms 1 in FIG. 9.

Referring to FIGS. 9 and 10, FIG. 9 a partial enlarged view of two driving mechanisms 1 arranged along the X axis, and FIG. 10 is a top view of the two driving mechanisms 1 in FIG. 9. As shown in FIGS. 9 and 10, two driving mechanisms 1 can be applied and arranged along the X axis in a dual-lens camera system. Each of the two driving mechanisms 1 has a quadrilateral structure, and two magnets M3 are disposed on the two adjacent sides of the two driving mechanisms 1. Since both of the magnets M3 are respectively offset from the corresponding coils C22 therebelow toward the interior of the two driving mechanisms 1, the distance L between the two magnets M3 can be increased to prevent magnetic interference between each other.

Figure 11:
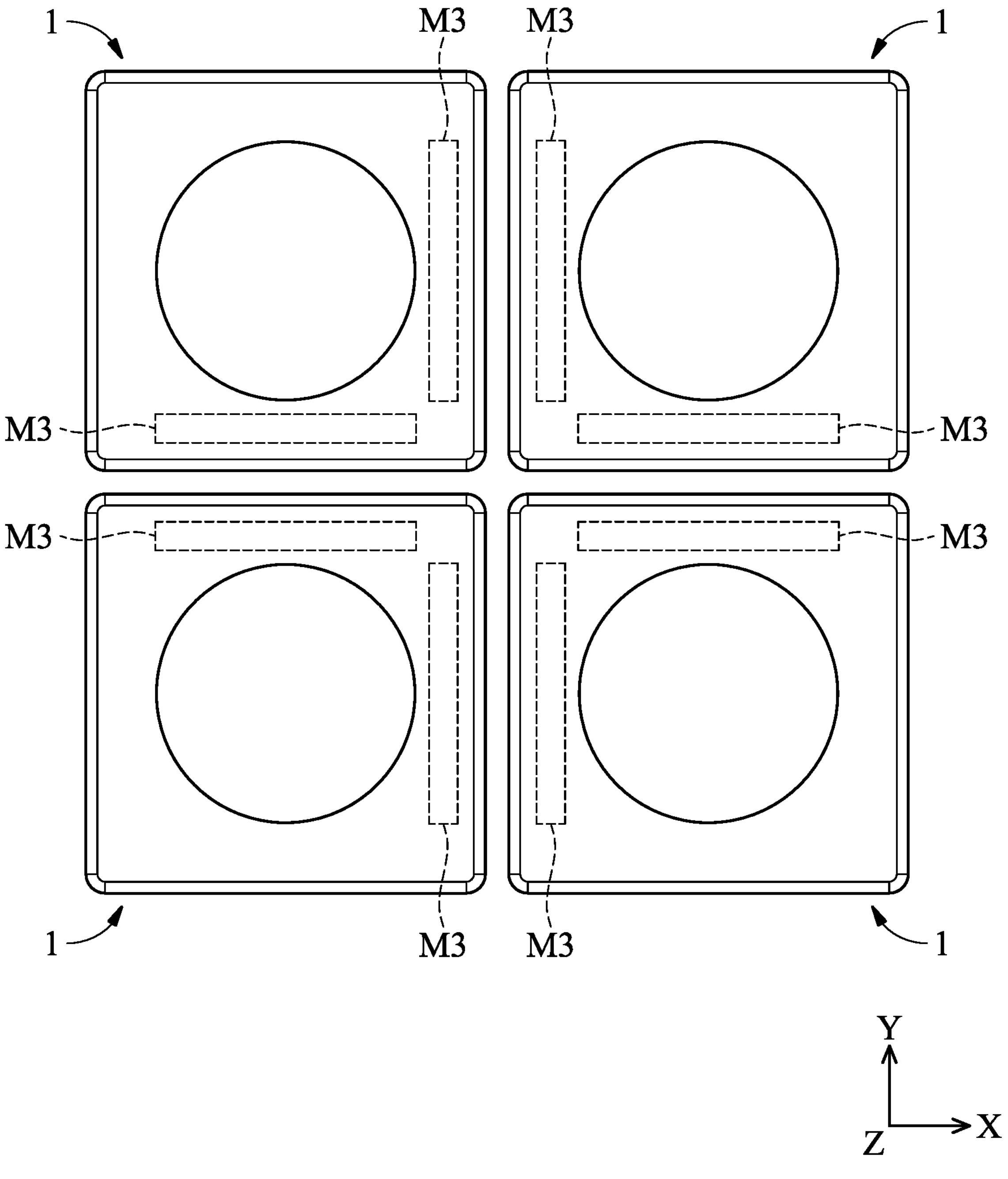
FIG. 11 is a top view of four driving mechanisms 1 arranged in a matrix.

Referring to FIG. 11, FIG. 11 is a top view of four driving mechanisms 1 arranged in a matrix. As shown in FIG. 11, four driving mechanisms 1 may be applied and arranged along the X axis (first axis) in a four-lens camera system. Here, each driving mechanism 1 has at least two magnets M3 located on two adjacent sides thereof, wherein each magnet M3 can be arranged in the driving mechanism 1 as disclosed in the aforementioned embodiments of FIGS. 1-9. Since the magnets M3 are respectively offset from the corresponding coils C22 therebelow toward the interior of the driving mechanisms 1, magnetic interference between the magnets M3 in different adjacent driving mechanisms 1 can be efficiently prevented.

Figure 12:
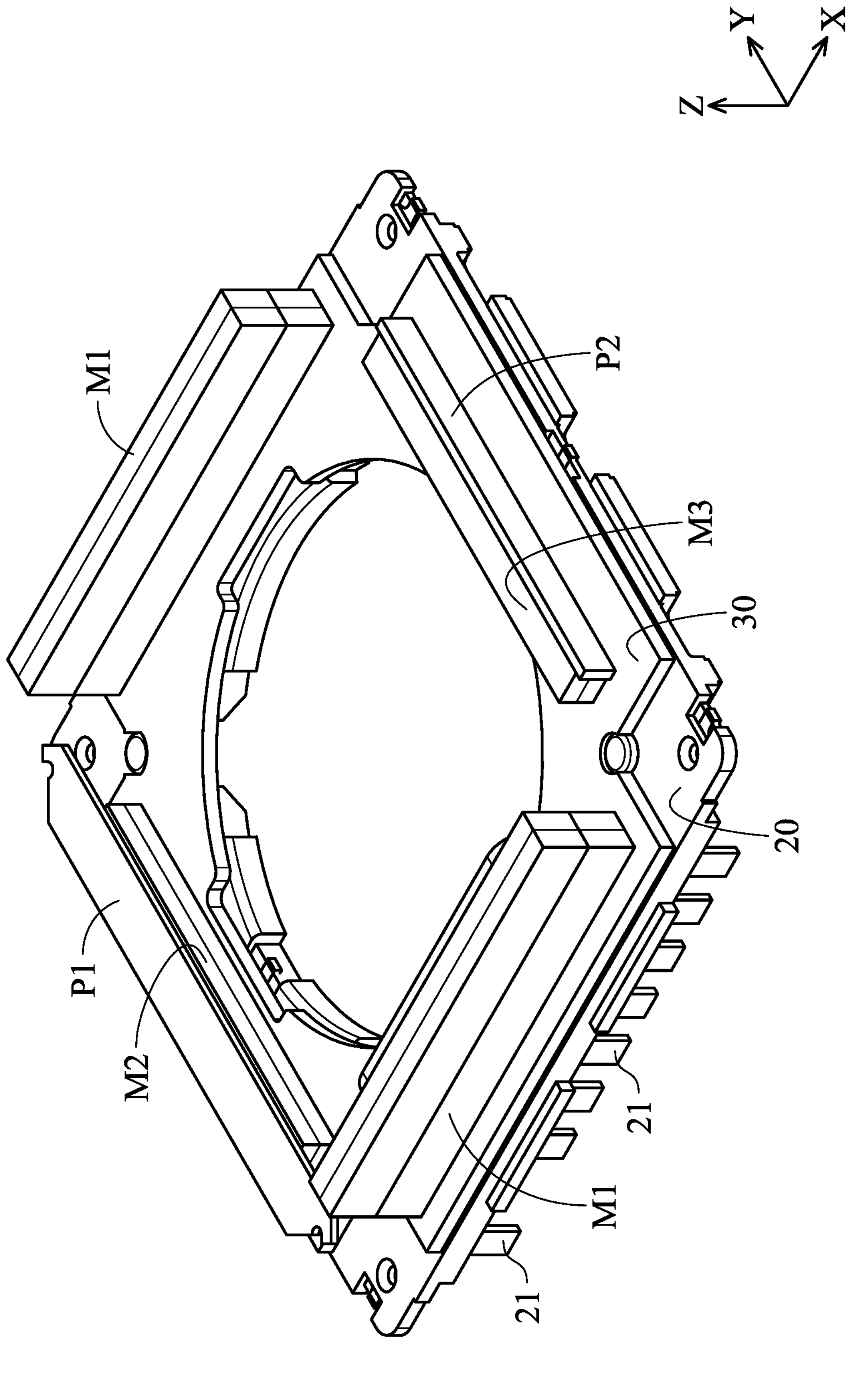
FIG. 12 shows a magnetically conductive element P2 disposed on an outer side of the magnet M3.
Figure 13:
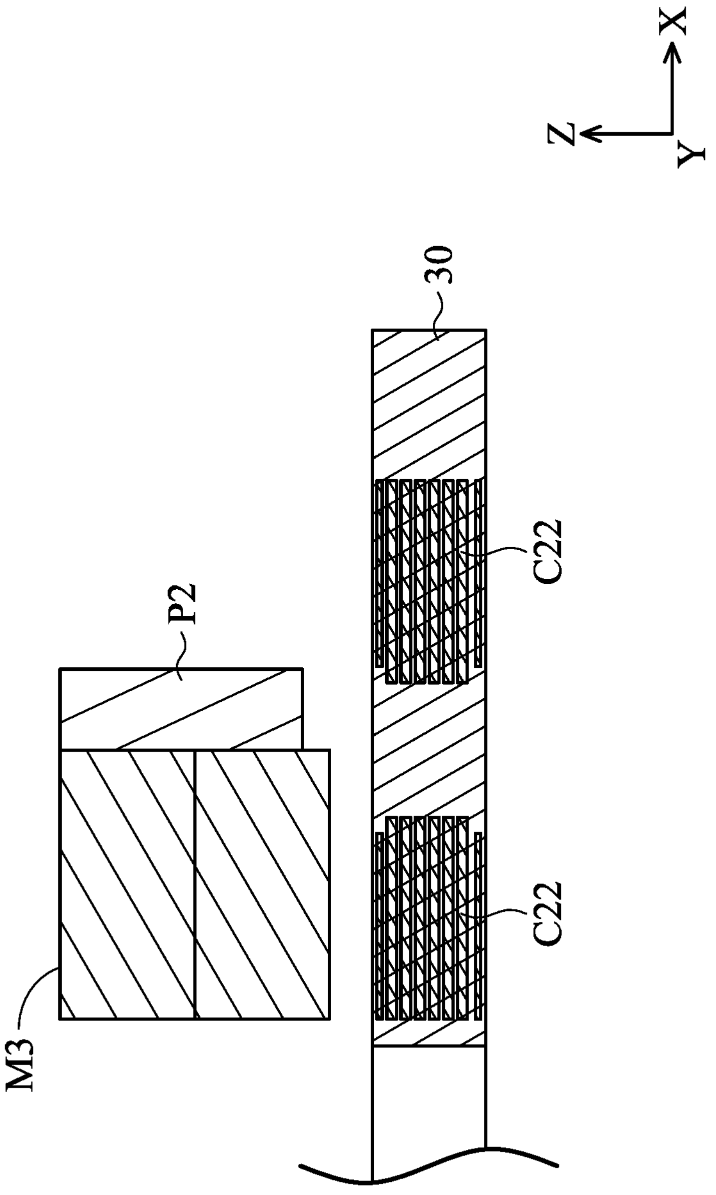
FIG. 13 is a partial enlarged view of the magnet M3, the magnetically conductive element P2, and the circuit board 30 in FIG. 12.

FIG. 12 shows a magnetically conductive element P2 disposed on an outer side of the magnet M3, and FIG. 13 is a partial enlarged view of the magnet M3, the magnetically conductive element P2, and the circuit board 30 in FIG. 12. Referring to FIGS. 12 and 13, since the magnetically conductive element P2 is disposed on an outer side of the magnet M3, the magnetic field distribution near the magnet M3 can be concentrated, whereby magnetic interference between the magnet M3 and other magnetic or electronic elements inside or outside of the driving mechanism 1 can be effectively prevented.

Figure 14:
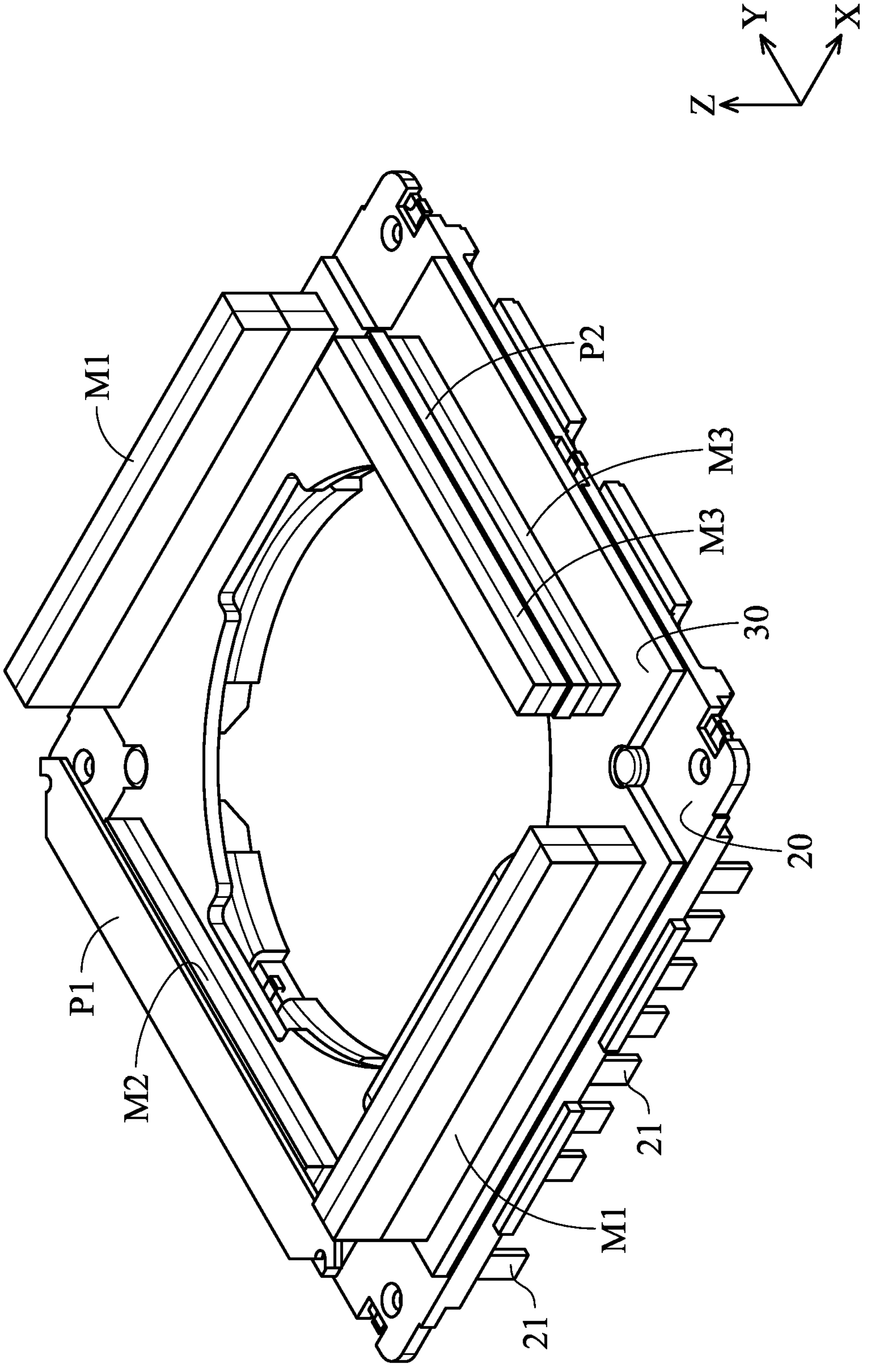
FIG. 14 shows a magnetically conductive element P2 disposed between two magnets M3.
Figure 15:
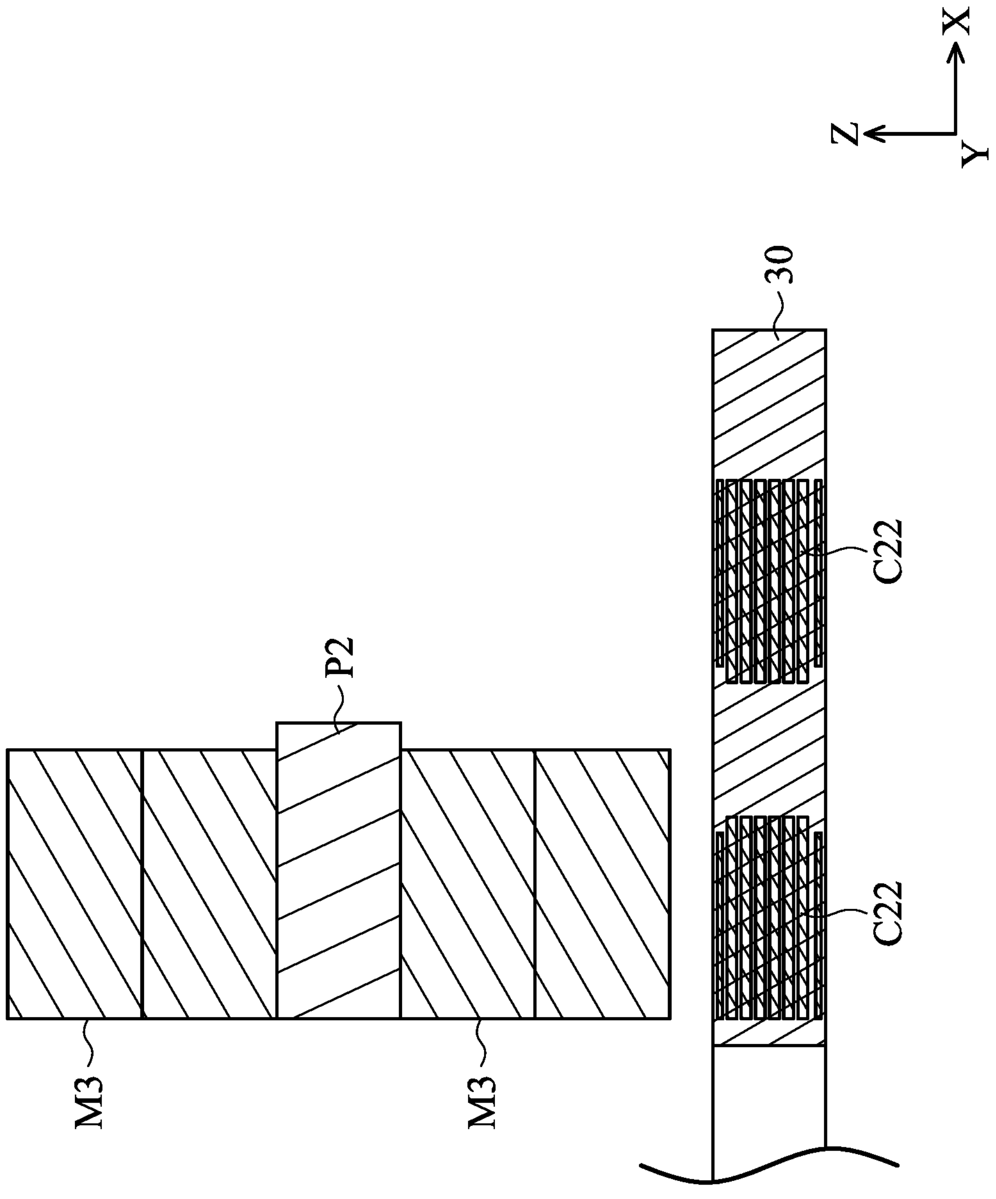
FIG. 15 is a partial enlarged view of the two magnets M3, the magnetically conductive element P2, and the circuit board 30 in FIG. 14.

Referring to FIGS. 14 and 15, FIG. 14 shows a magnetically conductive element the intermediate element) P2 disposed between two magnets M3, and FIG. 15 is a partial enlarged view of the two magnets M3, the magnetically conductive element P2, and the circuit board 30 in FIG. 14. As shown in FIGS. 14 and 15, two magnets M3 are provided on the side of the driving mechanism 1, and a magnetically conductive element P2 is disposed between the two magnets M3. With the magnetically conductive element P2 disposed between the magnets M3, the magnetic field distribution near the magnets M3 can be concentrated, so that magnetic interference between the magnets M3 and other magnetic or electronic elements inside or outside of the driving mechanism 1 can be prevented. Moreover, since the magnetically conductive element P2 protrudes from the outer surface of the two magnets M3, a joining or positioning structure can be formed to facilitate the efficient and accurate assembly of the driving mechanism 1. The first magnetic element (the magnet M3 in FIG. 15 that is farther from the coil C22) has a first surface facing the first coil (the coil C1 in FIG. 7) and a second surface facing the second magnetic element (the magnet M3 in FIG. 15 that is closer to the coil C22), and the first surface is not parallel with the second surface. The intermediate element P2 located between the first magnetic element and the second magnetic element. The intermediate element comprises an intermediate element surface that is parallel to the second surface. When viewed along a direction perpendicular to the second surface, the intermediate element does not overlap with at least part of the first magnetic element and the second magnetic element.

Figure 16:
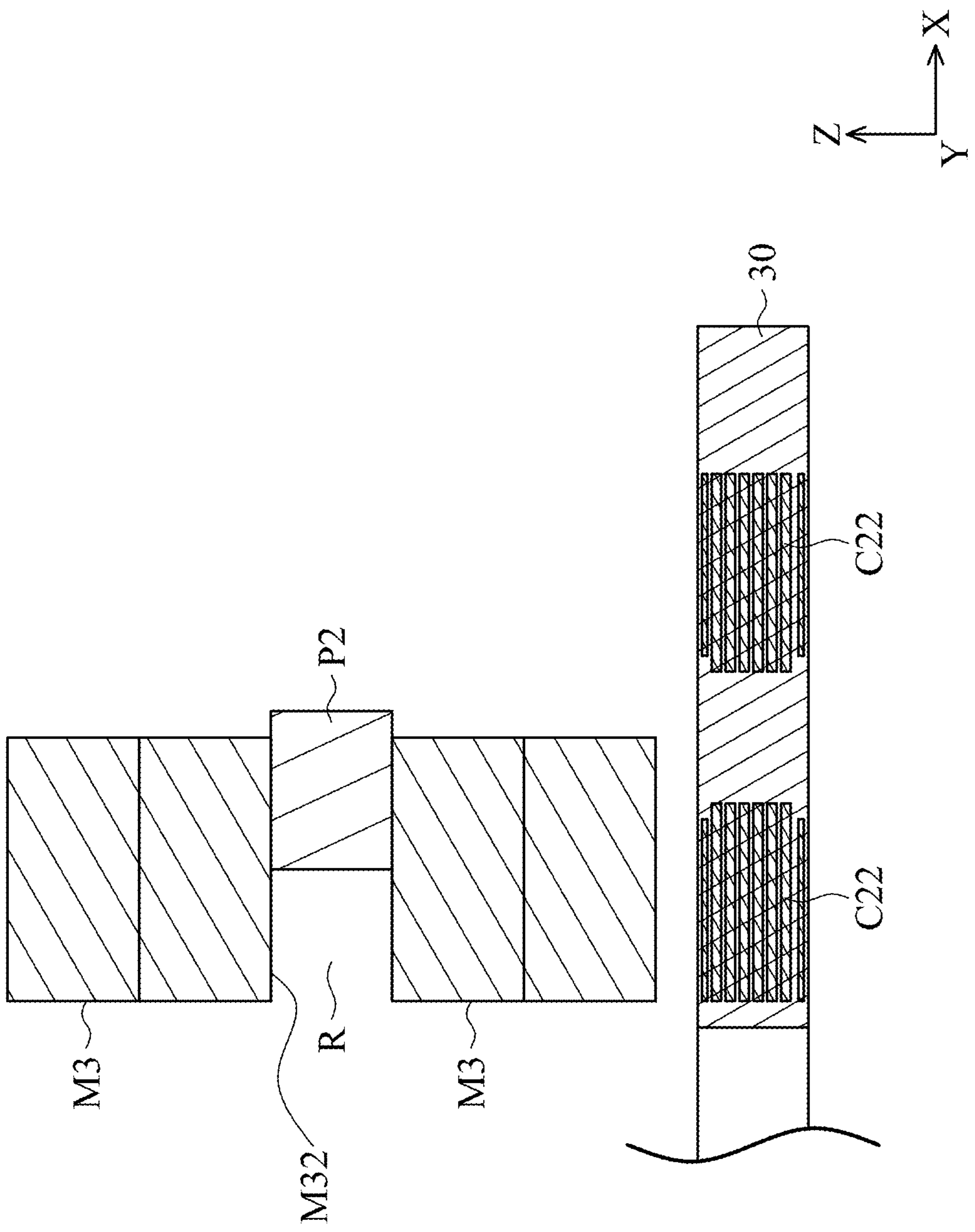
FIG. 16 shows a recess R formed by two magnets M3 and a magnetically conductive element P2 therebetween, in accordance with another embodiment of the invention.

Referring to FIG. 16, FIG. 16 shows a recess R formed by two magnets M3 and a magnetically conductive element P2 therebetween, in accordance with another embodiment of the invention. This embodiment is different from FIGS. 14 and 15 in that a recess R is formed by two magnets M3 and a magnetically conductive element P2. Hence, the recess R can also be utilized as a joining structure or positioning structure to facilitate the efficient and accurate assembly of the driving mechanism 1. In some embodiments, the recess R may be utilized for receiving a glue or adhesive, so that the magnets M3, the magnetically conductive element P2, and the frame 50 can firmly adhere to each other. Furthermore, as shown in FIG. 15 and FIG. 16, the first magnetic element (the magnet M3 in FIG. 15 and FIG. 16 that is farther from the coil C22), the intermediate element (magnetically conductive element P2), and the second magnetic element (the magnet M3 in FIG. 15 and FIG. 16 that is closer to the coil C22) are sequentially arranged along a direction parallel to the optical axis, for example, the negative Z direction. The first magnetic element, the intermediate element, and the second magnetic element are sequentially arranged along the direction perpendicular to a second surface M32 of the first magnetic element (the magnet M3 in FIG. 16 that is farther from the coil C22). The recess R is located between the first magnetic element (the magnet M3 in FIG. 16 that is farther from the coil C22) and second magnetic element (the magnet M3 in FIG. 16 that is closer to the coil C22). The recess R and the intermediate element (the magnetically conductive element P2) do not overlap when viewed along the direction perpendicular to the second surface M32. The intermediate element (the magnetically conductive element P2) protrudes in a direction away from the first coil (the coil C1 in FIG. 1). The first magnetic element (the magnet M3 in FIG. 16 that is farther from the coil C22), the intermediate element (the magnetically conductive element P2), and the second magnetic element (the magnet M3 in FIG. 16 that is closer to the coil C22) at least partially overlap when viewed along the optical axis (which is parallel to the Z-axis). The recess R and the intermediate element (the magnetically conductive element P2) do not overlap when viewed along the optical axis. The second coil (the coil C22), the first magnetic element (the magnet M3 in FIG. 16 that is farther from the coil C22), the intermediate element (the magnetically conductive element P2), and the second magnetic element (the magnet M3 in FIG. 16 that is closer to the coil C22) at least partially overlap when viewed along the optical axis. The intermediate element (the magnetically conductive element P2) does not overlap with the first coil (the coil 1 in FIG. 7) when viewed along the optical axis.

Figure 17:
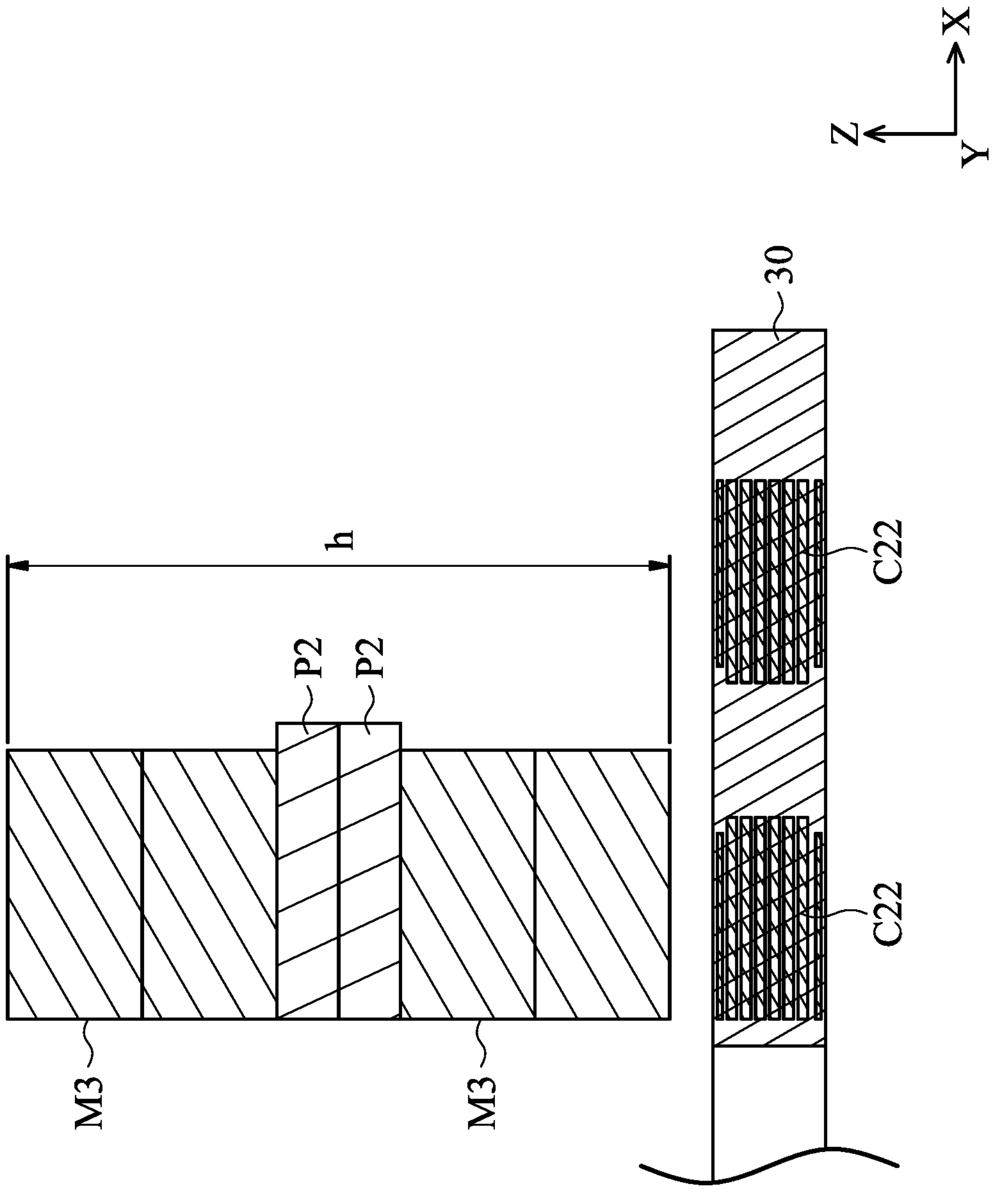
FIG. 17 shows a plurality of magnetically conductive elements P2 disposed between two magnets M3, in accordance with another embodiment of the invention.

Referring to FIG. 17, FIG. 17 shows a plurality of magnetically conductive elements P2 disposed between two magnets M3, in accordance with another embodiment of the invention. This embodiment is different from FIG. 16 in that at least two magnetically conductive elements P2 are disposed between the magnets M3. As shown in FIG. 17, the magnetically conductive elements P2 are aligned with the inner surfaces of the magnets M3 and protrude from the outer surfaces of the magnets M3.

With the two or more magnetically conductive elements P2 disclosed between the magnets M3, the magnetic field distribution near the magnets M3 can be further concentrated to reduce magnetic interference between the magnets M3 and other magnetic or electronic elements inside or outside of the driving mechanism 1. Moreover, when two or more driving mechanisms 1 are applied in a multi-lens camera system, the number of the magnetically conductive elements P2 can also be varied to adjust the positions and total height h of the two magnets M3 in the Z direction, so that the positions of the magnets M3 in adjacent driving mechanisms 1 can be aligned with each other. As a result, the magnetic forces generated by the magnets M3 of the adjacent driving mechanisms 1 along the horizontal direction can eliminated and balanced, so as to facilitate stability and reliability of the multi-lens camera system.

Figure 18:
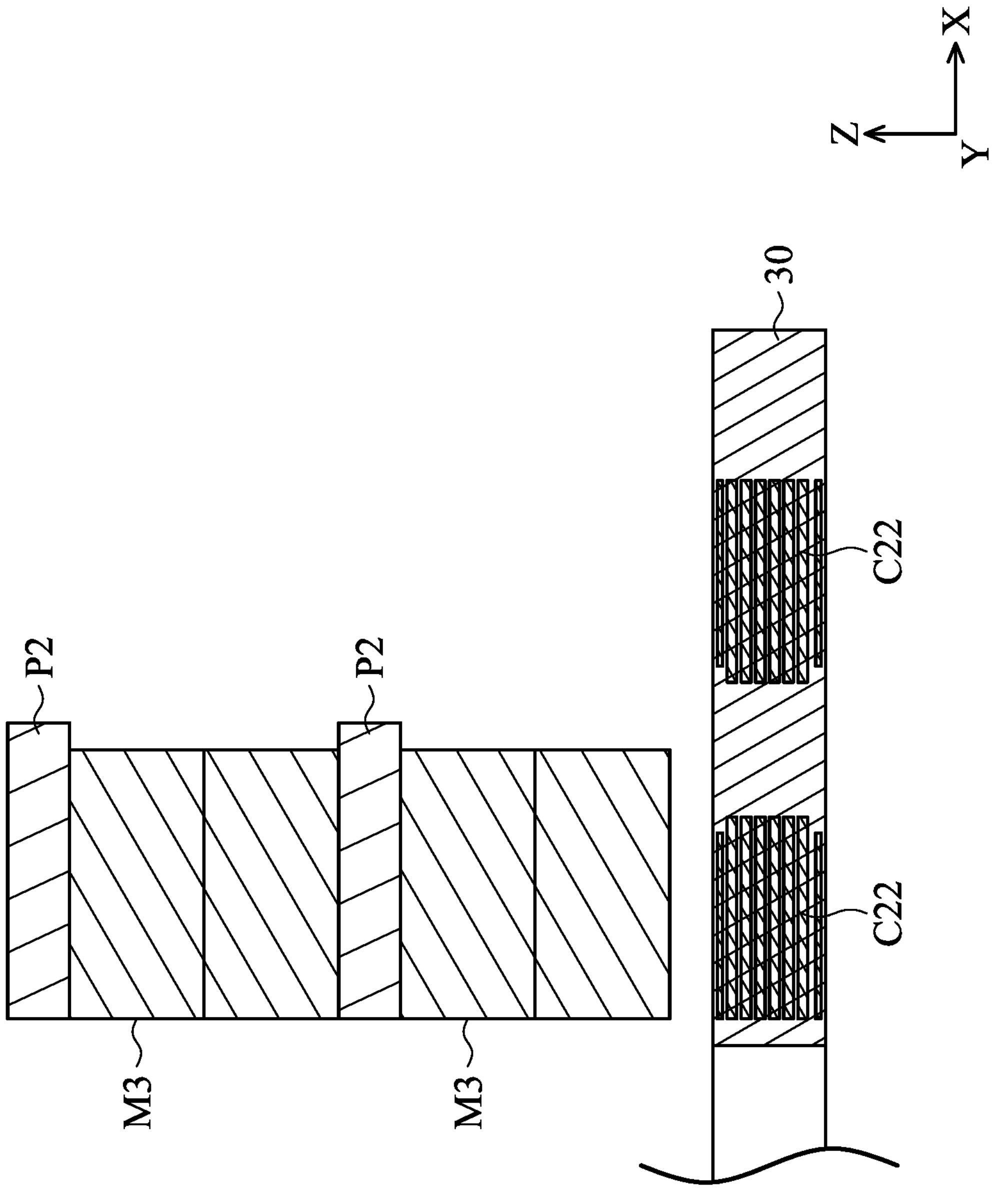
FIG. 18 shows a plurality of magnetically conductive elements P2 and magnets M3 stacked in a staggered manner, in accordance with another embodiment of the invention.

Referring to FIG. 18, FIG. 18 shows a plurality of magnetically conductive elements P2 and magnets M3 stacked in a staggered manner, in accordance with another embodiment of the invention. This embodiment is different from FIG. 17 in that the two magnetically conductive elements P2 are respectively disposed above two magnets M3. In FIG. 18, the magnetically conductive elements P2 and the magnets M3 are arranged in a staggered manner along the Z axis (second axis), wherein the lower one of the magnets M3 is closer to the coil C22 than the conductive elements P2. In some embodiments, two or more the magnetically conductive elements P2 may also be stacked on any one of the magnets M3.

According to the embodiment of FIG. 18, since the two magnetically conductive elements P2 are respectively disposed on the two magnets M3, the magnetic field distribution near the magnets M3 can be concentrated to prevent magnetic interference between the magnets M3 and other magnetic or electronic elements inside or outside of the driving mechanism 1. Moreover, when two or more driving mechanisms 1 are applied in a multi-lens camera system, the number of the magnetically conductive elements P2 can also be varied to adjust the positions and total height of the two magnets M3 in the Z direction, so as to improve the performance of the driving mechanisms 1 and the multi-lens camera system.

Figure 19:
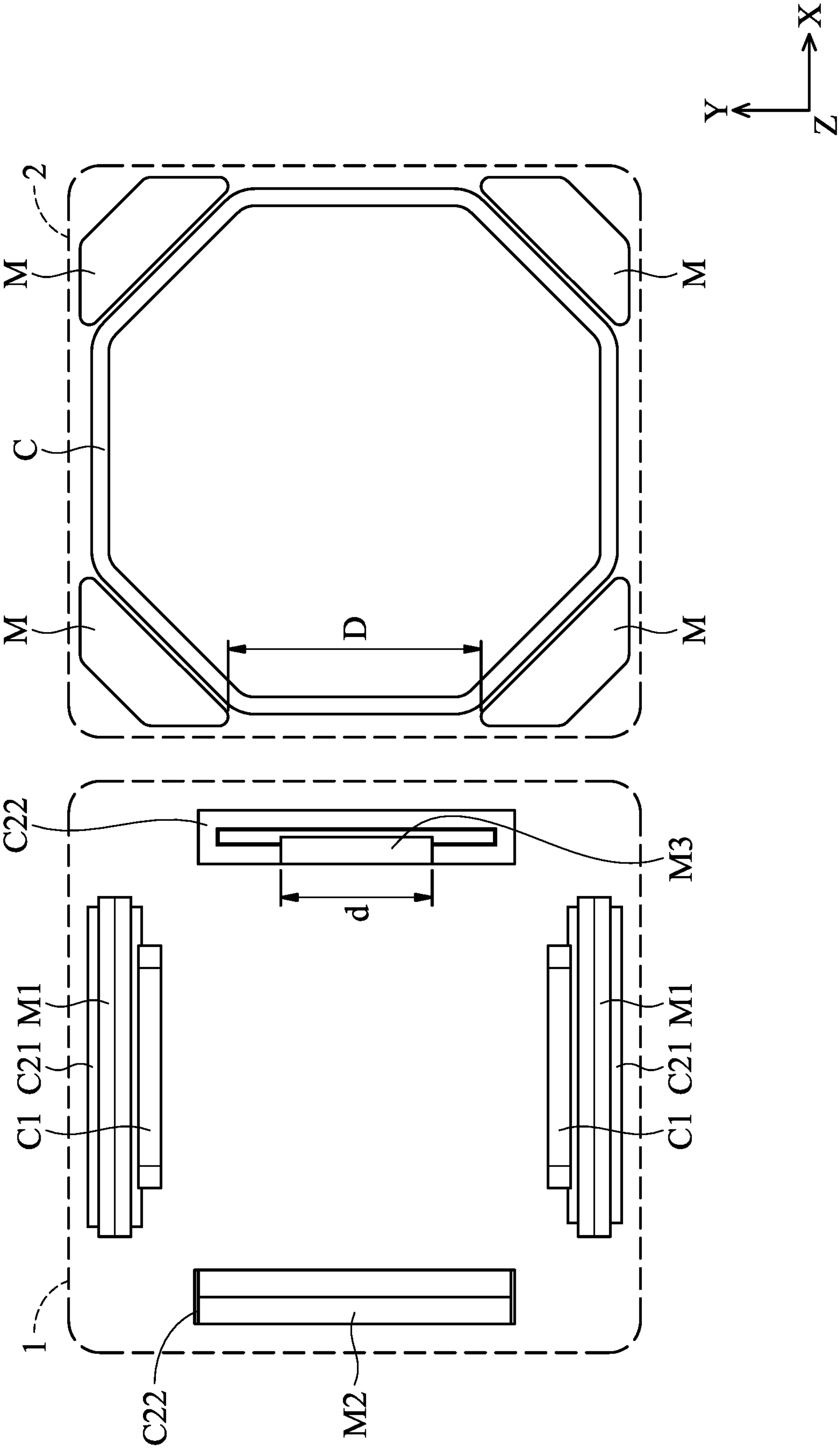
FIG. 19 is a schematic view showing a dual-camera system in accordance with another embodiment of the invention.

Referring to FIG. 19, FIG. 19 is a schematic view showing a dual-camera system in accordance with another embodiment of the invention. As shown in FIG. 19, the dual-camera system includes a driving mechanism 1 as disclosed in any one of the aforementioned embodiments and a camera unit 2 arranged along the X axis. The camera unit 2 has four magnetic elements M (e.g. magnets) and a winding C (e.g. a coil). When a current signal is applied to the winding C, an electromagnetic force can be produced for driving an optical lens (not shown) to move along the Z axis.

It should be realized that the magnetic elements M are disposed at the four corners of the camera unit 2. In contrast, the magnets M1, M2, and M3 at the left of FIG. 19 are disposed on the four sides of the quadrilateral driving mechanism 1, wherein the magnet M3 can be arranged in the driving mechanism 1 as disclosed in the aforementioned embodiments of FIGS. 1-18. Here, the magnet M3 has a length d along its longitudinal direction (Y direction), and two of the magnetic elements M are spaced apart from each other by a distance D along the longitudinal direction (Y direction), wherein the length d is shorter than the distance D.

When viewed along the X axis (first axis), the magnet M3 and the magnetic elements M do not overlap, whereby a sufficient distance between the magnet M3 and the magnetic elements M can be ensured to prevent magnetic interference therebetween.

Figure 20:
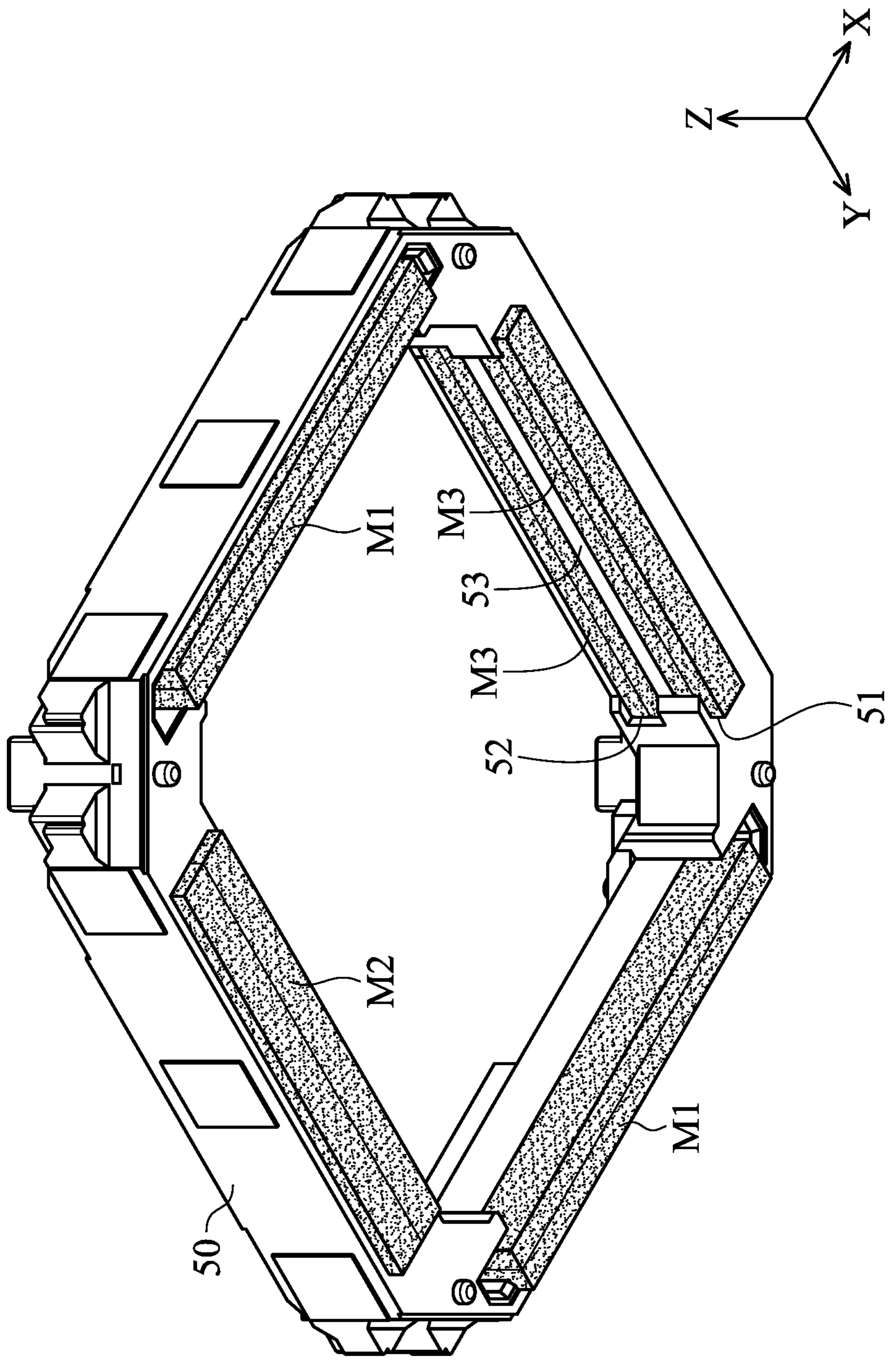
FIG. 20 is a schematic view showing the magnets M1, M2, and M3 affixed to the frame 50, in accordance with another embodiment of the invention.

Referring to FIG. 20, FIG. 20 is a schematic view showing the magnets M1, M2, and M3 affixed to the frame 50, in accordance with another embodiment of the invention. In the driving mechanism 1 of FIG. 20, the frame 50 may be integrally formed with the magnets M1, M2, and M3 by insert molding, so that the magnets M1, M2, and M3 are embedded into the four inner surfaces of the frame 50. FIG. 20 further shows that two magnets M3 are arranged along the Z axis and respectively received in a first cavity 51 and a second cavity 52 of the frame 50, wherein the two magnets M3 are spaced apart from each other by a rib 53 of the frame 50.

Figure 21:
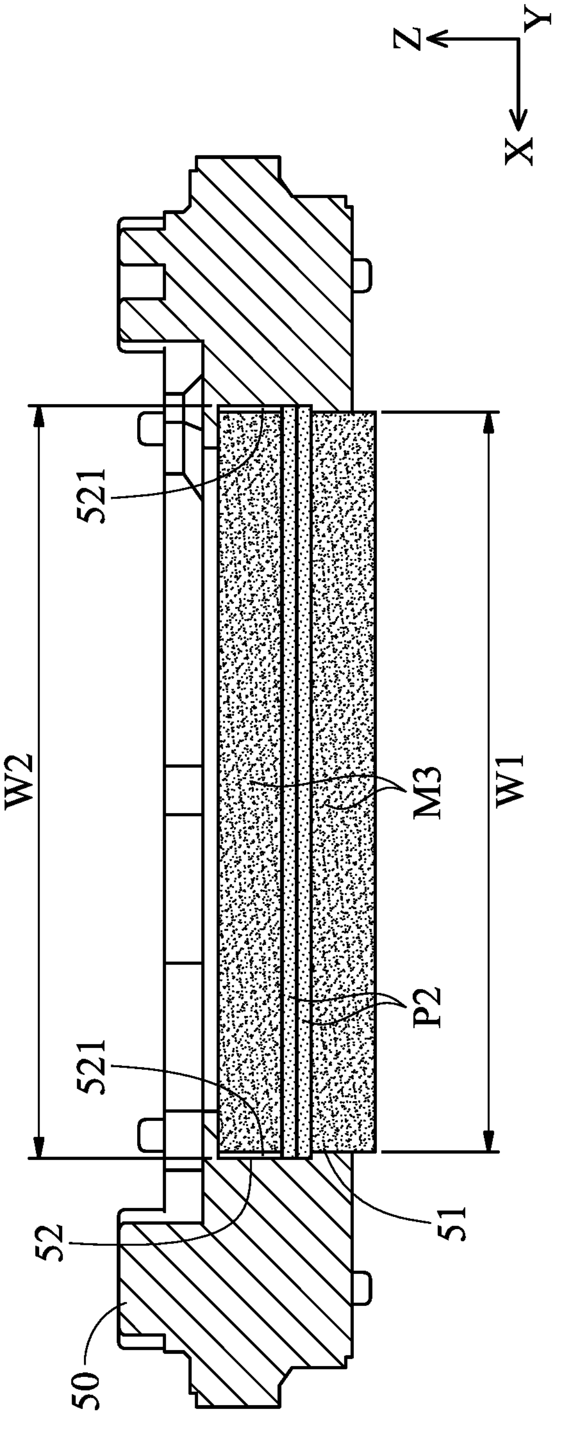
FIG. 21 is a schematic view showing the magnets M3 affixed to the frame 50, in accordance with another embodiment of the invention.

Referring to FIG. 21, FIG. 21 is a schematic view showing the magnets M3 affixed to the frame 50, in accordance with another embodiment of the invention. In the driving mechanism 1 of FIG. 21, two magnets M3 are respectively assembled in a first cavity 51 and a second cavity 52 of the frame 50, and at least a magnetically conductive element P2 is disposed between the two magnets M3.

It should be noted that the first cavity 51 has a width W1 substantially equal to the length of the two magnets M3 along the X axis, and the second cavity 52 has a width W2, substantially equal to the length of the magnetically conductive elements P2 and greater than the width W1 along the X axis. During assembly, the upper one of the magnets M3 and the magnetically conductive elements P2 can be inserted into the first cavity 51 that is wider than the second cavity 52, and a glue or adhesive can be applied in the gaps 521 formed between the magnet M3 and the frame 50 (FIG. 21). Therefore, the magnets M3 and the magnetically conductive elements P2 can be firmly affixed in a predetermined position of the frame 50, thereby facilitating efficient and precise assembly of the driving mechanism 1.

In summary, the coils C22 and the magnets M3 in all of the aforementioned embodiments can comprise a drive assembly for driving the movable module to move relative to the fixed module along a horizontal direction. Specifically, when two or more driving mechanisms 1 are applied in a multi-lens camera system, the magnetic interference between the magnets M3 therein can be efficiently reduced since they are offset from the centers of the corresponding coils C22 toward the interior of the driving mechanisms 1. In an embodiment, the driving mechanism 1 may have only one magnet M3 that is offset from the center of the coil C22 along the horizontal direction. In another embodiment, the driving mechanism 1 may have two or more magnets M3 arranged along the vertical direction and offset from the center of the coil C22 therebelow along the horizontal direction. Additionally, one or more magnetically conductive elements P2 may be disposed on a surface of the magnet M3 as a part of the drive assembly, thereby improving the performance of the driving mechanism 1 and the multi-lens camera system.

As technology has advanced, a lot of electronic devices (for example, cameras and smartphones) have incorporated the functionality of taking photographs and recording video. These electronic devices have become more commonplace, and have been developed to be more convenient and thin. More and more options are provided for users to choose from.

In some existing cell phones, a dual-lens camera system having two lens driving mechanisms may be applied. As the two lens driving mechanisms are usually arranged close to each other, magnetic interference between the magnets of the two lens driving mechanisms is likely to occur, causing the focus speed and accuracy of the lenses to be adversely affected. Therefore, what is needed is a multi-lens camera system that can prevent magnetic interference between the two lens driving mechanisms.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical element driving mechanism, comprising:
a frame;
a holder connected to an optical element with an optical axis, wherein the holder is movable relative to the frame; and
a drive assembly driving the holder to move relative to the frame, wherein the drive assembly comprises:
a first coil;
a first magnetic element corresponding to the first coil; and
a second magnetic element not in direct contact with the first magnetic element,
wherein the first magnetic element has a first surface facing the first coil and a second surface facing the second magnetic element, and the first surface is not parallel with the second surface,
wherein the optical element driving mechanism further comprises an intermediate element located between the first magnetic element and the second magnetic element, and the intermediate element comprises an intermediate element surface that is parallel to the second surface,
wherein when viewed along a direction perpendicular to the second surface, the intermediate element does not overlap with at least part of the first magnetic element and the second magnetic element,
wherein the first magnetic element, the intermediate element, and the second magnetic element are sequentially arranged along the direction perpendicular to the second surface,
wherein a recess is located between the first magnetic element and second magnetic element,
wherein the recess and the intermediate element do not overlap when viewed along the direction perpendicular to the second surface,
wherein the first magnetic element, the intermediate element, and the second magnetic element at least partially overlap when viewed along the optical axis, and
wherein the recess and the intermediate element do not overlap when viewed along the optical axis.

2. The optical element driving mechanism as claimed in claim 1, wherein when viewed from a direction that is perpendicular to the optical axis, the first magnetic element and the first coil at least partially overlap each other.

3. The optical element driving mechanism as claimed in claim 1, wherein when viewed from a direction that is perpendicular to the optical axis, the second magnetic element and the first coil at least partially overlap each other.

4. The optical element driving mechanism as claimed in claim 1, wherein the drive assembly further comprises a second coil, and the second magnetic element corresponds to the second coil.

5. The optical element driving mechanism as claimed in claim 4, wherein when viewed from the optical axis, the second magnetic element and the second coil at least partially overlap each other.

6. The optical element driving mechanism as claimed in claim 4, further comprising a circuit board, wherein the second coil is in the circuit board.

7. The optical element driving mechanism as claimed in claim 4, wherein the second coil has an inner portion and an outer portion, and a distance between the outer portion and the second magnetic element is different from a distance between the inner portion and the second magnetic element.

8. The optical element driving mechanism as claimed in claim 7, wherein the distance between the outer portion and the second magnetic element is greater than the distance between the inner portion and the second magnetic element.

9. The optical element driving mechanism as claimed in claim 7, further comprising a housing, wherein the outer portion is closer to the housing than the inner portion.

10. The optical element driving mechanism as claimed in claim 1, wherein the first coil is affixed to the holder.

11. The optical element driving mechanism as claimed in claim 1, wherein the first coil has an upper portion and a lower portion, a distance between a center of the upper portion and a center of the lower portion is different from a thickness of the first magnetic element.

12. The optical element driving mechanism as claimed in claim 11, wherein the distance between the center of the upper portion and the center of the lower portion is greater than the thickness of the first magnetic element.

13. The optical element driving mechanism as claimed in claim 11, wherein when viewed from a direction that is perpendicular to the optical axis, the first magnetic element is located between the center of the upper portion and the center of the lower portion.

14. The optical element driving mechanism as claimed in claim 1, wherein the first surface is a side surface of the first magnetic element, and the second surface is a bottom surface of the first magnetic element.

15. The optical element driving mechanism as claimed in claim 1, wherein a first electromagnetic force is generated between the first coil and the first magnetic element, a second electromagnetic force is generated between the first coil and the second magnetic element, and the first electromagnetic force and the second electromagnetic force drive the holder to move relative to the frame along the optical axis.

16. The optical element driving mechanism as claimed in claim 1, wherein a thickness of the first magnetic element is different from a vertical distance between the first magnetic element and the second magnetic element.

17. The optical element driving mechanism as claimed in claim 16, wherein the thickness of the first magnetic element is greater than the vertical distance between the first magnetic element and the second magnetic element.

18. The optical element driving mechanism as claimed in claim 1, further comprising a magnetically conductive element located between the first magnetic element and the second magnetic element.

19. The optical element driving mechanism as claimed in claim 18, wherein when viewed from the optical axis, the first magnetic element, the magnetically conductive element, and the second magnetic element at least partially overlap each other.

20. An optical element driving mechanism, comprising:

a frame;

a holder connected to an optical element with an optical axis, wherein the holder is movable relative to the frame; and a drive assembly driving the holder to move relative to the frame, wherein the drive assembly comprises:

a first coil;

a first magnetic element corresponding to the first coil; and a second magnetic element not in direct contact with the first magnetic element, wherein the first magnetic element has a first surface facing the first coil and a second surface facing the second magnetic element, and the first surface is not parallel with the second surface, wherein the optical element driving mechanism further comprises an intermediate element located between the first magnetic element and the second magnetic element, and the intermediate element comprises an intermediate element surface that is parallel to the second surface, wherein when viewed along a direction perpendicular to the second surface, the intermediate element does not overlap with at least part of the first magnetic element and the second magnetic element, wherein the first magnetic element, the intermediate element, and the second magnetic element are sequentially arranged along the direction perpendicular to the second surface, wherein the drive assembly further comprises a second coil, and the second magnetic element corresponds to the second coil, and wherein the second coil, the first magnetic element, the intermediate element, and the second magnetic element at least partially overlap when viewed along the optical axis.

21. An optical element driving mechanism, comprising:

a frame;

a holder connected to an optical element with an optical axis, wherein the holder is movable relative to the frame; and a drive assembly driving the holder to move relative to the frame, wherein the drive assembly comprises:

a first coil;

a first magnetic element corresponding to the first coil; and a second magnetic element not in direct contact with the first magnetic element, wherein the first magnetic element has a first surface facing the first coil and a second surface facing the second magnetic element, and the first surface is not parallel with the second surface, wherein the optical element driving mechanism further comprises an intermediate element located between the first magnetic element and the second magnetic element, and the intermediate element comprises an intermediate element surface that is parallel to the second surface, wherein when viewed along a direction perpendicular to the second surface, the intermediate element does not overlap with at least part of the first magnetic element and the second magnetic element, wherein the first magnetic element, the intermediate element, and the second magnetic element are sequentially arranged along the direction perpendicular to the second surface, wherein the intermediate element protrudes in a direction away from the first coil, and wherein the intermediate element does not overlap with the first coil when viewed along the optical axis.

* * * * *